United States Patent
Yamamoto

(10) Patent No.: US 9,176,781 B2
(45) Date of Patent: Nov. 3, 2015

(54) VIRTUAL MACHINE SYSTEM, MEMORY MANAGEMENT METHOD, MEMORY MANAGEMENT PROGRAM, RECORDING MEDIUM, AND INTEGRATED CIRCUIT

(75) Inventor: Tetsuji Yamamoto, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 323 days.

(21) Appl. No.: 13/814,589

(22) PCT Filed: Jul. 10, 2012

(86) PCT No.: PCT/JP2012/004436
§ 371 (c)(1),
(2), (4) Date: Feb. 6, 2013

(87) PCT Pub. No.: WO2013/008450
PCT Pub. Date: Jan. 17, 2013

(65) Prior Publication Data
US 2013/0139161 A1    May 30, 2013

(30) Foreign Application Priority Data
Jul. 14, 2011    (JP) .................................. 2011-155328

(51) Int. Cl.
G06F 9/455    (2006.01)
G06F 9/50    (2006.01)

(52) U.S. Cl.
CPC .................................... *G06F 9/5016* (2013.01)

(58) Field of Classification Search
None
See application file for complete search history.

(56) References Cited

U.S. PATENT DOCUMENTS

| | | |
|---|---|---|
| 2004/0010787 A1 | 1/2004 | Traut et al. |
| 2008/0098154 A1 | 4/2008 | Traut et al. |
| 2008/0163210 A1 | 7/2008 | Bowman et al. |
| 2010/0023941 A1 | 1/2010 | Iwamatsu et al. |
| 2010/0106885 A1* | 4/2010 | Gao et al. .......................... 711/6 |

FOREIGN PATENT DOCUMENTS

| | | |
|---|---|---|
| JP | 2004-133894 | 4/2004 |
| JP | 2007-66265 | 3/2007 |

(Continued)

OTHER PUBLICATIONS

International Search Report issued Aug. 7, 2012 in International (PCT) Application No. PCT/JP2012/004436.

*Primary Examiner* — Sisley Kim
(74) *Attorney, Agent, or Firm* — Wenderoth, Lind & Ponack, L.L.P.

(57) ABSTRACT

A virtual machine system for duplicating a first virtual machine to generate one or more second virtual machines is provided with a management unit that manages each memory area accessible by the first virtual machine so that after generation of the second virtual machines, every virtual machine is permitted to perform a read access to the memory area until any virtual machine performs a write access to the memory area, a determination unit that determines whether each memory area is a specific memory area, a detection unit that detects, after detecting a write access to a specific memory area, that a virtual machine other than the virtual machine performing the write access is attempting access to the specific memory area, and a memory allocation unit that acquires and allocates a new memory area to the virtual machine detected to be attempting access to the specific memory area.

10 Claims, 24 Drawing Sheets

(56) References Cited

FOREIGN PATENT DOCUMENTS

| JP | 2007066265 | * | 3/2007 |
| JP | 2008-165795 | | 7/2008 |
| JP | 2009-116914 | | 5/2009 |
| JP | 2010-33206 | | 2/2010 |

* cited by examiner

FIG. 5

OS memory management table 14

| Logical memory area 14a | Usage count 14b | Source information 14c |
|---|---|---|
| L1 | 1 | 0 |
| L2 | 1 | 0 |
| L3 | 1 | a |
| L4 | 0 | 0 |
| ... | ... | ... |

FIG. 6

Classification value table 201

| Classification value 201a | Usage status 201b | Memory allocation processing 201c |
|---|---|---|
| 0 | Exclusive use by one virtual machine | Processing unnecessary |
| 1 | Unused | First memory processing |
| 2 | Source exists | Second memory processing |
| 3 | — | Third memory processing |
| 4 | No source | Copy-on-write processing |
| 5 | — | New memory allocation processing |

FIG. 7

Virtual machine memory management table 311

| Physical memory area | Usage count | Classification value |
|---|---|---|
| P1 | 2 | 4 |
| P2 | 1 | 0 |
| P3 | 2 | 2 |
| P4 | 2 | 1 |
| ... | ... | ... |
| Pk | — | 5 |
| ... | ... | ... |

FIG. 8

Access control table 310

| Logical memory area | Physical memory area | Virtual machine | Access authorization |
|---|---|---|---|
| L1 | P1 | A | W prohibited |
|  |  | B | W prohibited |
| L2 | P2 | A | R/W permitted |
|  | P10 | B | R/W permitted |
| L3 | P3 | A | R/W prohibited |
|  |  | B | R/W prohibited |
| L4 | P4 | A | R/W prohibited |
|  |  | B | R/W prohibited |
| ... | ... | ... | ... |

FIG. 10

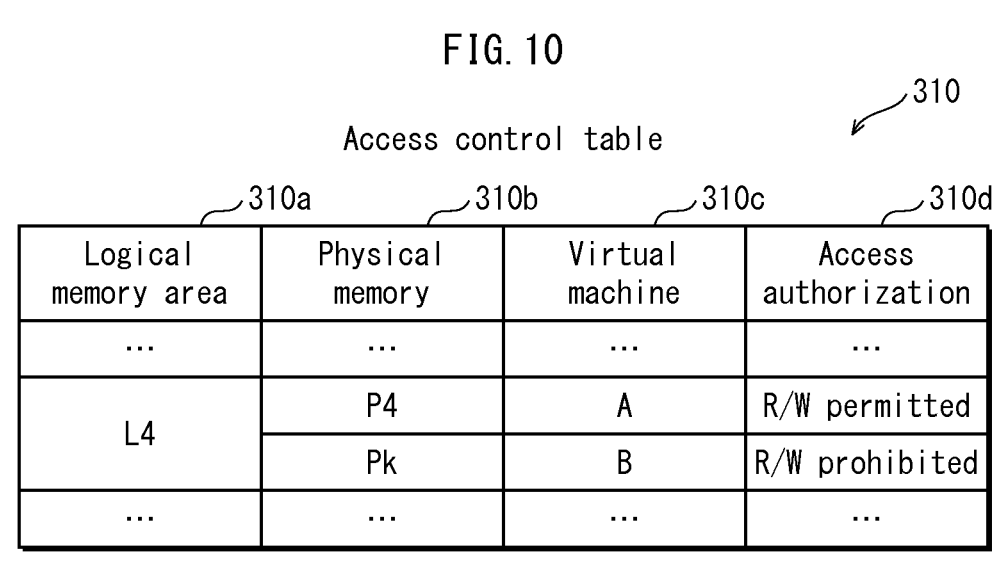

Access control table

| Logical memory area | Physical memory | Virtual machine | Access authorization |
|---|---|---|---|
| ... | ... | ... | ... |
| L4 | P4 | A | R/W permitted |
| | Pk | B | R/W prohibited |
| ... | ... | ... | ... |

Access control table  310C

| Logical memory area | Physical memory area | Virtual machine | Access authorization |
|---|---|---|---|
| L1 | P1 | A | R/W permitted |
| L2 | P2 | A | R/W permitted |
| L3 | P3 | A | R/W permitted |
| ... | ... | ... | ... |
| Free memory list area | Memory list monitoring area | A | R/W prohibited |
| ... | ... | ... | ... |

VIRTUAL MACHINE SYSTEM, MEMORY MANAGEMENT METHOD, MEMORY MANAGEMENT PROGRAM, RECORDING MEDIUM, AND INTEGRATED CIRCUIT

TECHNICAL FIELD

The present invention relates to virtual machine systems, and in particular to a technique for reducing the amount of memory used in a system in which an operating system (OS), which is the execution environment for application programs, is generated as needed and caused to operate.

BACKGROUND ART

In recent years, not only personal computers, but also an increasing number of household appliances have a network connection function. However, programs that operate maliciously, such as spyware, may be released on networks. The danger of downloading and executing one of these programs is increasing. As a security measure under such conditions, research and development is underway into virtual machine system technology that executes a plurality of operating systems (virtual machines) simultaneously by generating an operating system (OS) as an environment for downloading and executing a non-trusted program in isolation from a safe OS.

In general, when executing a plurality of virtual machines simultaneously, the amount of memory necessary for execution increases, thus raising the manufacturing cost of the device. In order to reduce costs, methods of duplicating a virtual machine have been proposed (for example, see Patent Literature 1 and Patent Literature 2).

CITATION LIST

Patent Literature

Patent Literature 1: Japanese Patent Application Publication No. 2008-165795
Patent Literature 2: Japanese Patent Application Publication No. 2009-116914

SUMMARY OF INVENTION

Technical Problem

Even with a structure to duplicate a virtual machine by copy-on-write as described above, however, there is still a demand for further reduction in the amount of memory used.

The present invention has been conceived in light of the above problem, and it is an object thereof to provide a virtual machine system that prevents unnecessary securing of physical memory areas by copy-on-write.

Solution to Problem

In order to solve the above problems, a virtual machine system according to an aspect of the present invention is for duplicating a first virtual machine to generate one or more second virtual machines and comprises: a management unit configured to manage each memory area among one or more memory areas accessible by the first virtual machine so that after generation of the one or more second virtual machines, every virtual machine is permitted to perform a read access to the memory area until any virtual machine among the first virtual machine and the one or more second virtual machines performs a write access to the memory area; a determination unit configured to determine whether the memory area is a specific memory area whose content before the write access needs to be stored, when the write access to the memory area is performed, for subsequent access by a virtual machine other than the virtual machine performing the write access; a first detection unit configured to detect the write access to the specific memory area; a second detection unit configured to detect, after the first detection unit detects the write access, that a virtual machine other than the virtual machine performing the write access is attempting access to the specific memory area; and a memory allocation unit configured to acquire a new memory area and allocate the new memory area, as a target of the access, to the virtual machine attempting access to the specific memory area as detected by the second detection unit.

Advantageous Effects of Invention

With the above structure, the virtual machine system according to the present invention prevents the unnecessary acquisition of physical memory areas by copy-on-write processing.

BRIEF DESCRIPTION OF DRAWINGS

FIG. 5 illustrates the data structure and an example of the content of an OS memory management table 14.

FIG. 6 illustrates the data structure and an example of the content of a classification value table 201.

FIG. 7 illustrates the data structure and an example of the content of a virtual machine memory management table 311.

FIG. 8 illustrates the data structure and an example of the content of an access control table 310.

FIG. 10 illustrates the access control table 310 after duplication of a virtual machine and after completion of the first memory processing upon an initial write access by the virtual machine A10.

DESCRIPTION OF EMBODIMENTS

Discovery Leading to an Aspect of the Present Invention

The inventor carefully studied the method of duplicating a virtual machine assumed in the above-described conventional technology.

In this method of duplicating a virtual machine, a new virtual machine is generated by duplicating the currently running virtual machine to provide an execution environment for executing a non-trusted program (application program). At this point, basic programs, middleware, and the like for the OS are placed in the same physical memory area and shared by both virtual machines. During operation of the virtual machines, when one of the virtual machines attempts to change the content of memory in the physical memory area shared by the two virtual machines, processing (copy-on-write) is performed to acquire a new, separate virtual memory area and allocate dedicated physical memory areas to the two virtual machines. Allocating memory in this way reduces the amount of memory used.

Figure 27:
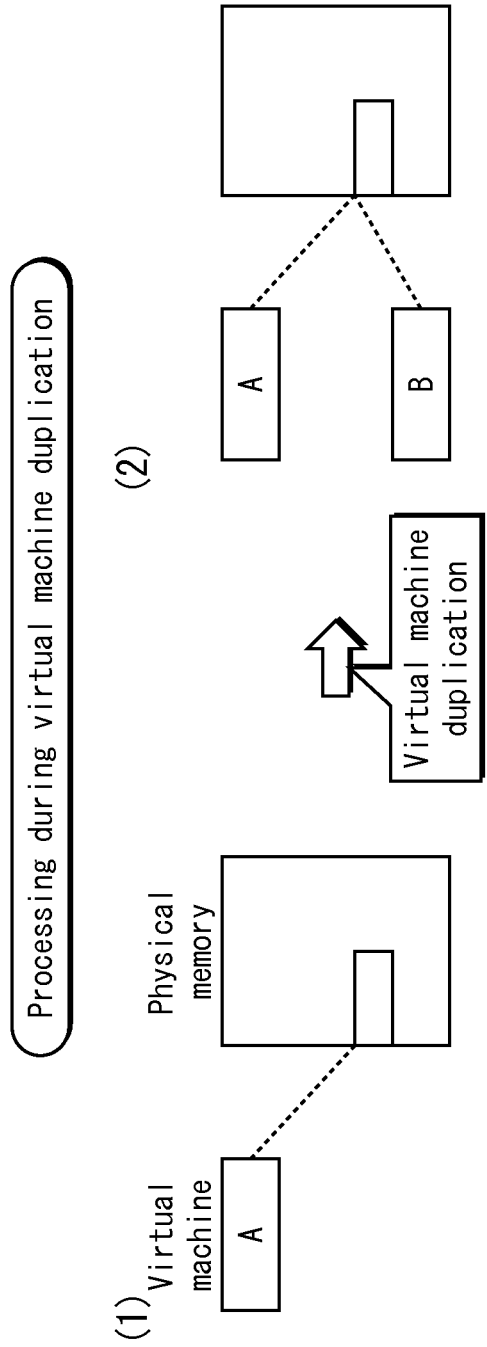
FIG. 27 illustrates processing during virtual machine duplication.
Figure 28:
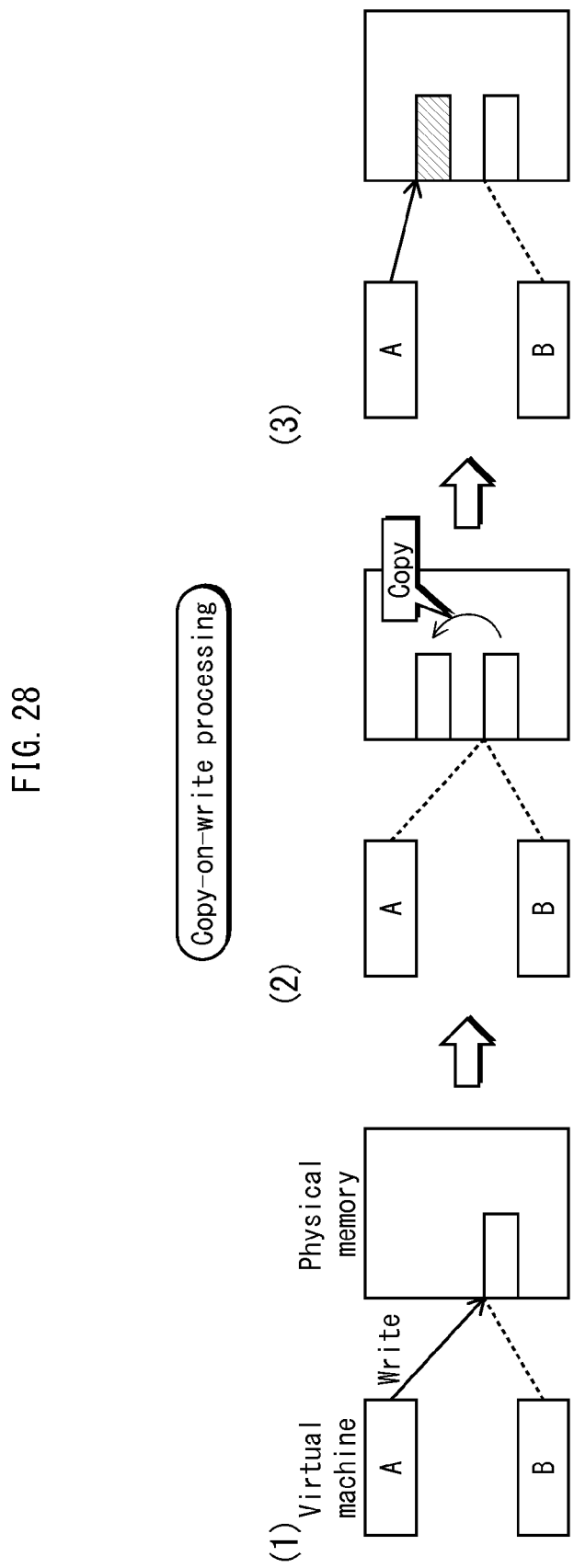
FIG. 28 illustrates copy-on-write processing.

FIGS. 27 and 28 illustrate copy-on-write processing.

The logical addresses of the memory areas allocated to virtual machine A are mapped one-to-one to physical addresses of physical memory (FIG. 27(1)). Upon duplication of the virtual machine, the logical addresses of virtual machine A are duplicated to generate virtual machine B. In this way, a plurality of virtual machines refer to the same physical addresses (FIG. 27(2)).

During the "copy-on-write processing" illustrated in FIG. 28, upon the first write access by any of the virtual machines (FIG. 28(1)), a physical memory area of physical memory is newly acquired, and memory is copied (FIG. 28(2)). The virtual machine that first performed the write access writes into the newly acquired physical memory area (FIG. 28(3)). In other words, until the first write access from one of the virtual machines occurs, the physical memory area is shared by the two virtual machines, thereby reducing the amount of memory used. When the first write access occurs from one of the virtual machines, the other virtual machine can still refer to the content before the write access.

As a result of carefully studying the method of duplicating a virtual machine assumed in the above-described conventional technology, the inventor discovered the problem that if a physical memory area before duplication of the virtual machine is unnecessary for virtual machine B, then during copy-on-write processing, a physical memory area is unnecessarily acquired. For example, if an application program or like on virtual machine A does not use a certain memory area before duplication of the virtual machine, the physical memory area corresponding to this unused memory area does not contain any meaningful values. During the copy-on-write processing described above, if one of the virtual machines attempts a write access, a physical memory area is acquired to maintain the content of the unused physical memory area, even though the other virtual machine has no need to refer to the content of the unused physical memory area.

With respect to this point, the inventor arrived at the present invention by discovering, after repeated study, that it is possible to reduce the amount of memory used as compared to the duplication of a virtual machine assumed under conventional technology. This reduction is possible by distinguishing the content of the physical memory area before duplication of the virtual machine and not securing a new physical memory area when the other virtual machine has no need to refer to the content of the physical memory area.

The following describes an embodiment of the virtual machine system according to the present invention with reference to FIGS. 1 through 19.

Embodiment 1

Outline

Figure 1:
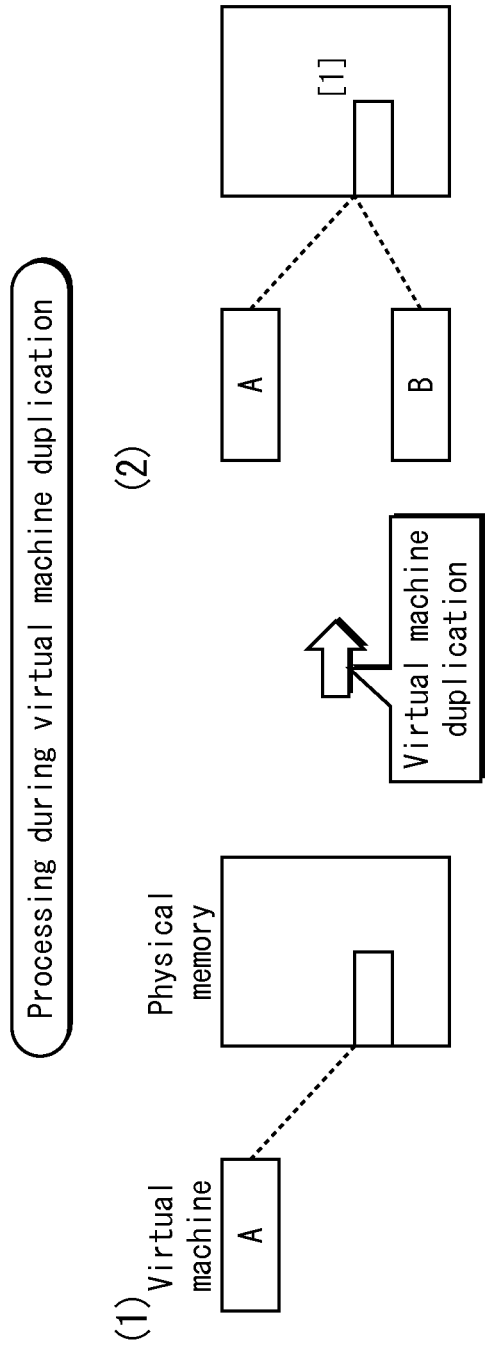
FIG. 1 schematically represents conditions when duplicating a virtual machine in a virtual machine system 1.

FIG. 1 schematically represents conditions when duplicating a virtual machine in a virtual machine system 1 according to Embodiment 1.

When duplicating a virtual machine, the virtual machine system 1 assigns a classification value in accordance with the usage status of the memory area of virtual machine A (FIG. 1(2)). Here, for example, when duplicating an unused memory area, the virtual machine system 1 assigns a classification value of "1" to the physical memory area corresponding to the unused memory area.

Figure 2:
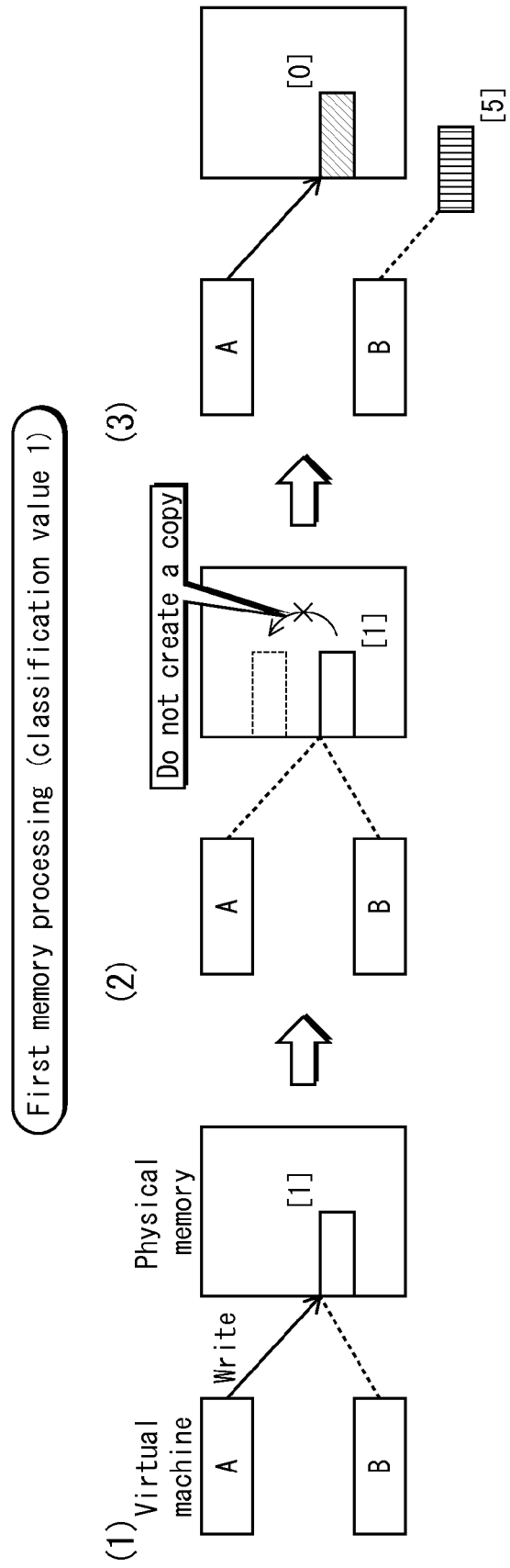
FIG. 2 illustrates processing when one of the virtual machines attempts a write access to a physical memory area assigned a classification value of "1", schematically showing first memory processing.

FIG. 2 illustrates processing when one of the virtual machines attempts a write access to a physical memory area assigned a classification value of "1".

As illustrated in FIG. 2, when virtual machine A first attempts a write access to a physical memory area assigned a classification value of "1" (FIG. 2(1)), no new physical memory area is acquired (FIG. 2(2)), and virtual machine A simply writes into the physical memory area targeted by the access (FIG. 2(3)). At this point, the virtual machine system 1 sets virtual machine B to access a virtual memory area (FIG. 2(3)).

Figure 3:
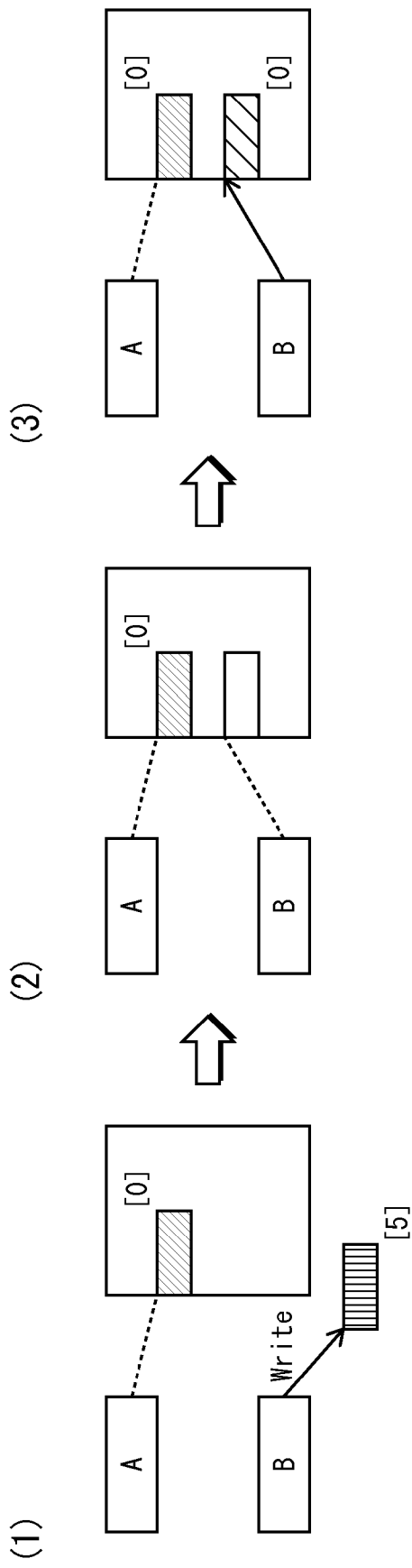
FIG. 3 illustrates processing when a virtual machine attempts a write access to a memory area assigned a classification value of "5", schematically showing new memory allocation processing.

Subsequently, as illustrated in FIG. 3, when virtual machine B attempts to access the virtual memory area (FIG. 3(1)), the virtual machine system 1 acquires a new physical memory area for the first time (FIG. 3(2)) and causes the accessing virtual machine B to write into (or read from) the acquired physical memory area (FIG. 3(3)). In other words, when virtual machine B accesses the physical memory area, it suffices to prepare an unused memory area by securing a new physical memory area and performing initialization or the like.

In this way, after duplication of the virtual machine, the virtual machine system 1 does not acquire a new physical memory area when one of the virtual machines first attempts a write access, thereby reducing the amount of memory used as compared to copy-on-write processing.

Structure

Next, with reference to FIGS. 4 through 10, the structure of the virtual machine system 1 is described.

Figure 4:
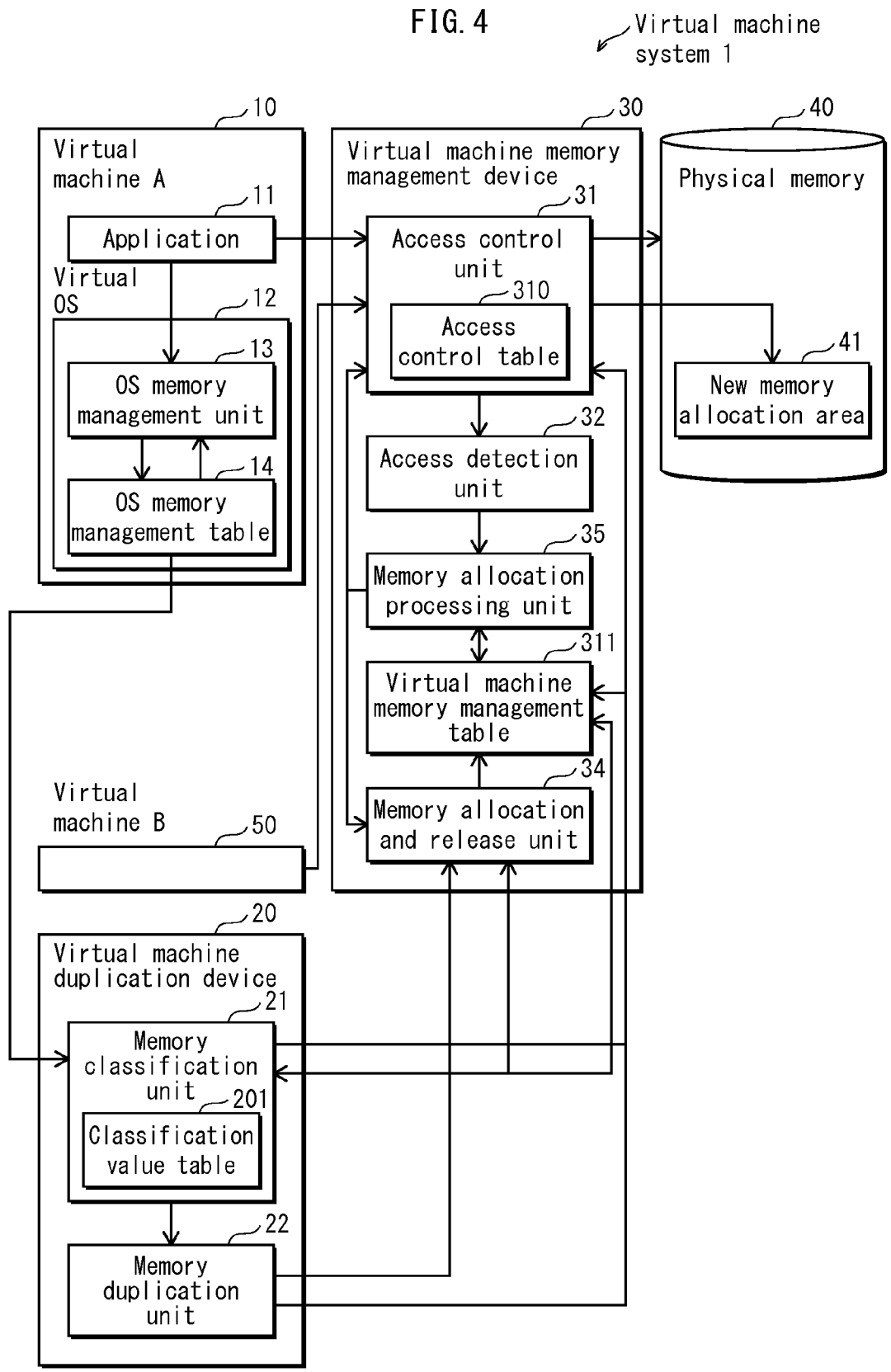
FIG. 4 is a functional structure diagram of the virtual machine system 1 according to Embodiment 1.

FIG. 4 is a functional structure diagram of the virtual machine system 1 according to Embodiment 1.

The virtual machine system 1 duplicates a virtual machine A10 to generate a virtual machine B50, allocates memory areas to both of the virtual machines, and controls execution of each virtual machine.

As illustrated in FIG. 4, the virtual machine system 1 is provided with the virtual machine A10, a virtual machine duplication device 20, a virtual machine memory management device 30, and a physical memory 40.

The virtual machine A10 and the virtual machine B50 are each a virtual computer on which an OS, application programs, and the like operate. For example, the virtual machine A10 and the virtual machine B50 perform AV processing, network processing, and the like.

During execution of the virtual machine A, the virtual machine duplication device 20 receives a new virtual machine start-up request from a user or the like and then duplicates the virtual machine A10 to generate a new virtual machine B50. Note that a plurality of virtual machines may be duplicated simultaneously.

The virtual machine memory management device 30 receives a request from the virtual machine A10 and the virtual machine B50 to access the physical memory 40 and controls access to the corresponding memory area.

The physical memory 40 is for storing information by specification of the addresses of memory areas.

The virtual machine A10, the virtual machine duplication device 20, and the virtual machine memory management device 30 are described below.

The virtual machine A10 is provided with an application 11 and a virtual OS 12.

The application 11 is a program for performing AV processing, network processing, or the like on the virtual machine A10.

The virtual OS 12 is provided with similar functions as a typical OS, receives a request from the application 11 on the virtual machine A10, and performs processing such as management of the memory usage status, memory area allocation, and program execution on the virtual machine A10. The virtual OS 12 is provided with an OS memory management unit 13 and an OS memory management table 14.

The OS memory management unit 13 manages the usage status of memory areas allocated to the virtual machine A10. The usage status of a memory area is information on whether the memory area is being used by an application, a driver, or the like and includes an indication of whether a source exists for the information stored in the memory area.

The OS memory management table 14 is a table used when the OS memory management unit 13 performs memory management on the virtual machine A10.

FIG. 5 illustrates the data structure and an example of the content of the OS memory management table 14.

As illustrated in FIG. 5, the OS memory management table 14 lists, in association, a logical memory area 14a, a usage count 14b, and source information 14c. The logical memory area 14a stores the logical address of a memory area allocated to the virtual machine A10. Note that the logical memory areas are, for example, managed by page, each page being 4 kB or the like. The usage count 14b stores the number of applications, drivers, or the like that are using the memory area in the virtual machine A10. For example, a value of "0" for this usage count indicates that the corresponding memory area is unused. When the content of the memory area is also located in a supplementary storage device (for example, a hard disk or the like), the source information stores information indicating that location (for example, a path or the like). When there is no source, a value of "0" is stored to indicate no source. When, for example, the application 11 issues a request to acquire memory to the virtual OS 12, the OS memory management unit 13 refers to the OS memory management table 14, searches for an unused memory area (a logical memory area whose usage count is "0"), and allocates the unused memory area to the application 11. The OS memory management unit 13 then adds "1" to the usage count corresponding to the allocated memory area so as to identify that the memory area is in use.

Next, the structure of the virtual machine duplication device 20 is described.

The virtual machine duplication device 20 is provided with a memory classification unit 21 and a memory duplication unit 22.

The memory classification unit 21 is provided with a classification value table 201 and performs memory classification processing. Memory classification processing is performed before duplication of the virtual machine A10 and is processing to assign a classification value, described below, to each memory area used by the virtual machine A10 based on the classification value table 201 and on information related to the memory area usage status stored in the OS memory management table 14.

FIG. 6 illustrates the data structure and an example of the content of the classification value table 201.

The classification value table 201 lists, in association, a classification value 201a and a usage status 201b. The classification value 201a stores a classification value, which is a value for identifying the content of memory allocation processing by the virtual machine memory management device 30. Memory allocation processing 201c is processing for handling a memory area that is the target of access by one of the virtual machines after virtual machine duplication. Details are provided below. The usage status 201b stores information indicating the usage status of a memory area being used by the virtual machine A10. The memory classification unit 21 refers to the OS memory management table 14 to determine the usage status of the memory area and determines the classification value corresponding to the usage status in the classification value table 201. For example, "exclusive use by one virtual machine" indicates a memory area that should be, or that already is, allocated only to one virtual machine. "Unused" indicates that the memory area has not been used by an application, a driver, or the like on the virtual machine A10. For example, "unused" corresponds to when the usage count in the OS memory management table 14 is "0". "Source exists" indicates that the same content as the content that the virtual machine A10 stores in the memory area and uses is also currently stored in a separate location from the memory area (for example, on a hard disk, in a memory area separately managed by the OS, or the like). Therefore, when both the virtual machine A10 and the virtual machine B50 share the memory area, then when one of the virtual machines attempts a write access to the memory area, it is not necessary to store the content before the write access for use by the other virtual machine. Cases such as the following correspond to "source exists": when source information is located in the OS memory management table 14, or after the content of the memory area is rewritten by a virtual machine, when it poses no problem for the other virtual machine to read the rewritten content. "No source" indicates that the same content as the content that the virtual machine A10 stores in the memory area and uses is not stored in a separate location from the memory area. Therefore, when both the virtual machine A10 and the virtual machine B50 share a memory area with this usage status, then when one of the virtual machines attempts a write access to the memory area, it is necessary to store the content before the write access for use by the other virtual machine. "No source" corresponds to when no value is listed for the source information in the OS memory management table 14, or when the content of the memory area should not be rewritten by one of the virtual machines.

In the present embodiment, the classification value corresponding to the usage status of "exclusive use by one virtual machine" is "0", the classification value corresponding to "unused" is "1", the classification value corresponding to "source exists" is "2", and the classification value corresponding to "no source" is "4". Classification values of "3" and "5" are not assigned by the memory classification unit 21, but rather are intermediate values assigned during the memory allocation processing described below.

During memory classification processing, the memory classification unit 21 acquires the classification value corresponding to the usage status of the memory area and writes the classification value in a virtual machine memory management table 311.

FIG. 7 illustrates the data structure and an example of the content of the virtual machine memory management table 311.

As illustrated in FIG. 7, the virtual machine memory management table 311 lists, in association, a physical memory area 311a, a usage count 311b, and a classification value 311c. The physical memory area 311a stores a physical address indicating a memory area in the physical memory 40. The usage count 311b stores the number of virtual machines that are using the corresponding physical memory area. A value of "0" for the usage count indicates that the corresponding physical memory area is not being used by any virtual machine. The classification value 311c stores a classification value, which is a value for identifying the content of memory allocation processing by the virtual machine memory management device 30. During memory classification processing, the memory classification unit 21 writes values into the classification values in this table for all of the memory areas allocated to the virtual machine A10. The virtual machine memory management table 311 with the classification values written therein is referred to later during memory allocation processing by a memory allocation processing unit 35.

Furthermore, during the memory classification processing, the memory classification unit 21 sets access authorization in accordance with the classification level in an access control table 310, described below. This is for the virtual machine memory management device 30 to detect that the virtual machine has performed access and to detect the type of access.

FIG. 8 illustrates the data structure and an example of the content of the access control table 310.

The access control table 310 is for conversion (mapping) between logical memory areas and physical memory areas, for setting the virtual machine to which each physical memory area is allocated, and for setting access authorization.

The access control table 310 lists, in association, a logical memory area 310a, a physical memory area 310b, a virtual machine 310c, which is information on the virtual machine to which the physical memory area is allocated, and an access authorization 310d for the virtual machine. A logical memory area and a physical memory correspond one-to-one for each virtual machine. The example illustrated in FIG. 8 shows conditions after duplication of a virtual machine. The physical memory areas 310b "P1", "P3", "P4" are memory areas shared by the virtual machine A10 and the virtual machine B50. The physical memory areas 310b "P2" and "P10" are each only allocated to one virtual machine. The memory classification unit 21 sets the access authorization 310d in order to detect when a virtual machine performs access. When, for example, the access authorization 310d is set to "R/W prohibited" and a virtual machine attempts a read access or a write access, the access control unit 31, described below, refers to the access control table 310 and throws an exception. The access control unit 31 can also detect access by a virtual machine and the type of access.

The memory duplication unit 22 receives a request from the memory classification unit 21 and issues a request for allocation of a physical memory area to a memory allocation and release unit 34, described below, thereby securing a physical memory area. The memory duplication unit 22 also copies data from the indicated memory area into the acquired physical memory area and makes a setting in the access control table 310 for the indicated virtual machine to access the newly acquired physical memory area. In other words, this table associates the newly acquired physical memory area with a virtual machine. Furthermore, the memory duplication unit 22 sets the classification value corresponding to the newly acquired physical memory area in the virtual machine memory management table 311 to "0", and adds "1" to the usage count.

Next, the structure of the virtual machine memory management device 30 is described.

The virtual machine memory management device 30 is provided with the access control unit 31, the access control table 310, an access detection unit 32, the memory allocation processing unit 35, the virtual machine memory management table 311, and the memory allocation and release unit 34.

After duplication of a virtual machine, the access control unit 31 monitors access to physical memory areas by the virtual machine A10 and the virtual machine B50. If an access monitor setting for write access, read access, or both is set, the access control unit 31 also notifies the access detection unit 32 when the target of monitoring is accessed. At that point, the access control unit 31 transmits the type of access, i.e. write access or read access, information on the virtual machine that performed access, and information on the physical memory area targeted by the access to the access detection unit 32.

The access detection unit 32 receives the type of access, the information on the virtual machine, and the information on the physical memory area from the access control unit 31 and issues a request for memory allocation processing to the memory allocation processing unit 35, described below.

The memory allocation and release unit 34 receives, from the memory classification unit 21, the memory duplication unit 22, and the memory allocation processing unit 35 described below, a physical memory area allocation request or a request to release an indicated physical memory area and performs processing to either allocate or release a physical memory area for the virtual machine A10 and the virtual machine B50. Upon receiving an allocation request, the memory allocation and release unit 34 refers to the virtual machine memory management table 311 (see FIG. 7), searches for an unused physical memory area (i.e. a physical memory area whose usage count is "0"), and adds "1" to the usage count corresponding to the physical memory area to indicate that the physical memory area is in use. The memory allocation and release unit 34 also allocates the physical memory area to the source of the allocation request. Upon receiving a release request, the memory allocation and release unit 34 reduces the usage count in the virtual machine memory management table 311 corresponding to the physical memory area indicated by the request.

Upon receiving a memory allocation processing request from the access detection unit 32, the memory allocation processing unit 35 allocates memory to a virtual machine as needed, based on the classification value assigned by the memory classification unit 21. Specifically, the memory allocation processing unit 35 refers to the virtual machine memory management table 311, identifies the classification value corresponding to the physical memory area accessed by the virtual machine, and performs memory allocation processing in accordance with the classification value. The memory allocation processing unit 35 issues a request for allocation of a new physical memory area to the memory allocation and release unit 34 as needed. The memory allocation processing unit 35 also makes settings in the access control table 310 as needed. Furthermore, the memory allocation processing unit 35 updates the classification value in the virtual machine memory management table 311 as needed.

Next, the structure of the memory allocation processing unit 35 is described.

Figure 9:
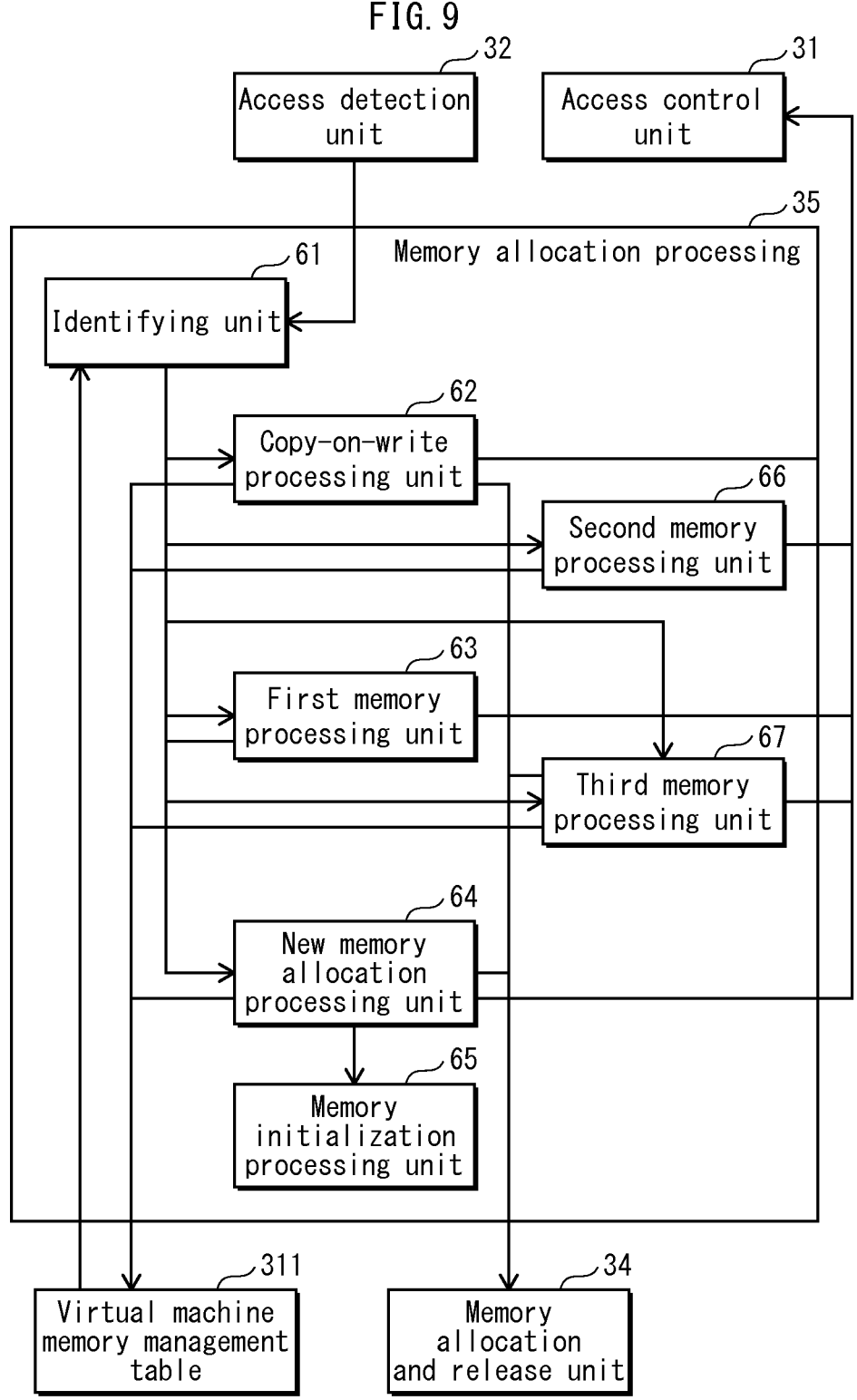
FIG. 9 is a functional structure diagram of a memory allocation processing unit 35.

FIG. 9 is a functional structure diagram of the memory allocation processing unit 35.

As illustrated in FIG. 9, the memory allocation processing unit 35 is provided with an identifying unit 61, a copy-on-write processing unit 62, a first memory processing unit 63, a new memory allocation processing unit 64, a memory initialization processing unit 65, a second memory processing unit 66, and a third memory processing unit 67.

Based on the classification value assigned to the physical memory area, the identifying unit 61 identifies the processing for the physical memory area. The identifying unit 61 receives, from the access detection unit 32, the type of access by the virtual machine, i.e. write access or read access, as well as information on the virtual machine that performed access and information on the physical memory area targeted by the access. The identifying unit 61 refers to the virtual machine memory management table 311 to acquire the classification value corresponding to the received physical memory area. The identifying unit 61 issues a request for processing to the first memory processing unit 63 for a classification value of "1", to the second memory processing unit 66 for a classification value of "2", to the third memory processing unit 67 for a classification value of "3", to the copy-on-write processing unit 62 for a classification value of "4", and to the new memory allocation processing unit 64 for a classification value of "5".

The copy-on-write processing unit 62 performs copy-on-write processing. Copy-on-write processing is as described above (see FIG. 28) and corresponds to the classification value "4". The access authorization for a memory area assigned a classification value of "4" is set to "W prohibited" by the memory classification unit 21. Accordingly, the identifying unit 61 issues a request for processing to the copy-on-write processing unit 62 only when a write access by a virtual machine is detected. The copy-on-write processing unit 62 is invoked by the identifying unit 61, issues a request to the memory allocation and release unit 34 for allocation of a new physical memory area, and copies the content of the physical memory area targeted for access into the acquired physical memory area. The copy-on-write processing unit 62 makes a setting in the access control table 310 to allocate the newly acquired physical memory area to the accessing virtual machine and stops monitoring access. Furthermore, the copy-on-write processing unit 62 sets the usage count to "1" and the classification value to "0" for the newly acquired physical memory area in the virtual machine memory management table 311. The copy-on-write processing unit 62 also stops monitoring access of the original physical memory area, reduces the usage count of the original physical memory area by "1", and sets the classification value to "0" in the virtual machine memory management table 311.

The first memory processing unit 63 performs first memory processing. The first memory processing is the processing described above in the "Outline" section (see FIG. 2) and corresponds to the classification value "1". The first memory processing unit 63 is invoked by the identifying unit 61 and makes a setting in the access control table 310 to stop monitoring of access by the accessing virtual machine. Furthermore, the first memory processing unit 63 sets the usage count to "1" and the classification value to "0" for the physical memory area that is the target of access in the virtual machine memory management table 311. The first memory processing unit 63 also makes a setting in the access control table 310 so that the other virtual machine that is set to refer to the physical memory area accesses a new memory allocation area 41.

FIG. 10 illustrates the access control table 310 after duplication of a virtual machine and after completion of first memory processing upon an initial write access by the virtual machine A10. Note that FIG. 8 illustrates the access control table 310 after duplication of a virtual machine and before the start of first memory processing.

As illustrated in FIG. 10, the physical memory area "P4" is allocated directly to the virtual machine A10, and monitoring of access is stopped. "Pk", which is the new memory allocation area 41, is allocated to the virtual machine B50, and monitoring of access is set to "R/W prohibited". The physical memory area "Pk" is set to a classification value of "5" in the virtual machine memory management table 311.

The new memory allocation area 41 indicates a specific memory area. The access control unit 31 detects access by a virtual machine to this memory area and provides notification to the access detection unit 32. The classification value in the virtual machine memory management table 311 corresponding to the new memory allocation area 41 is set to "5". Note that an actual existing physical memory area need not be associated with the new memory allocation area 41. A virtual memory area may be defined instead (in other words, an identifier or the like for the physical memory area 310b may be set in the access control table 310, and the classification value "5" may be associated with this identifier in the virtual machine memory management table 311). That is, it suffices to execute new memory allocation processing corresponding to the classification value "5" when a virtual machine accesses the new memory allocation area 41.

The new memory allocation processing unit 64 performs new memory allocation processing. The new memory allocation processing is the processing described above in the "Outline" section (see FIG. 3) and corresponds to the classification value "5". The new memory allocation processing unit 64 is invoked by the identifying unit 61, issues a request to the memory allocation and release unit 34 for allocation of a new physical memory area, and invokes the memory initialization processing unit 65 described below to cause initial values to be written. The new memory allocation processing unit 64 makes a setting in the access control table 310 to allocate the newly acquired physical memory area to the accessing virtual machine. The new memory allocation processing unit 64 also stops monitoring of the newly acquired physical memory area. Furthermore, the new memory allocation processing unit 64 sets the usage count to "1" and the classification value to "0" for the newly acquired physical memory area in the virtual machine memory management table 311.

The memory initialization processing unit 65 is invoked by the new memory allocation processing unit 64 and performs initialization processing for an indicated physical memory area using a predetermined data sequence (for example, a sequence such as all zeros, "00 . . . 0").

The second memory processing unit 66 performs second memory processing. The second memory processing corresponds to the classification value "2". The following describes the second memory processing. The classification value "2" is the classification when the usage status of the memory area upon duplication of a virtual machine is "source exists". This could be the case when an application or the like was using the memory area before duplication of the virtual machine, and after duplication of the virtual machine, one of the virtual machines first performed a read access, and then the other virtual machine performed a read access. From the perspective of virtual machine system performance, it is not preferable to throw an exception each time a read access occurs. Therefore, the physical memory area for which one of the virtual machines first performs a read access is the target of copy-on-write processing, which does not throw an exception for a read access. In other words, the second memory processing unit 66 sets the classification value to "4" for the physical memory area that is the target of access in the virtual machine memory management table 311. The second memory processing unit 66 also makes a setting in the access control table 310 to stop monitoring of read access by the accessing virtual machine.

On the other hand, after duplication of the virtual machine, when one of the virtual machines first performs a write access, processing to further reduce the amount of memory used as compared to copy-on-write processing is performed, as during first memory processing. In other words, the second memory processing unit 66 sets the classification value to "3" for the physical memory area that is the target of access in the virtual machine memory management table 311. The second memory processing unit 66 also makes a setting in the access control table 310 to stop monitoring of read/write access by the accessing virtual machine.

The third memory processing unit 67 performs third memory processing. The third memory processing corresponds to the classification value "3". When the virtual machine performs a read access or a write access, the third memory processing issues a request to the memory allocation and release unit 34 for allocation of a new physical memory area and copies the content of the physical memory area targeted for access into the acquired physical memory area. The third memory processing unit 67 also makes a setting in the access control table 310 to allocate the newly acquired physical memory area to the accessing virtual machine and stops monitoring access. Furthermore, the third memory processing unit 67 sets the usage count to "1" and the classification value to "0" for the newly acquired physical memory area in the virtual machine memory management table 311. The third memory processing unit 67 also reduces the usage count by "1" for the physical memory area that was the source of copying in the virtual machine memory management table 311. After being reduced by "1", if the value of the usage count is "1", the third memory processing unit 67 sets the classification value to "0".

Operations

With reference to FIGS. 11 through 19, the following describes operations by the virtual machine system 1 (having the structure in FIGS. 1 and 9).

Memory Classification Processing

Figure 11:
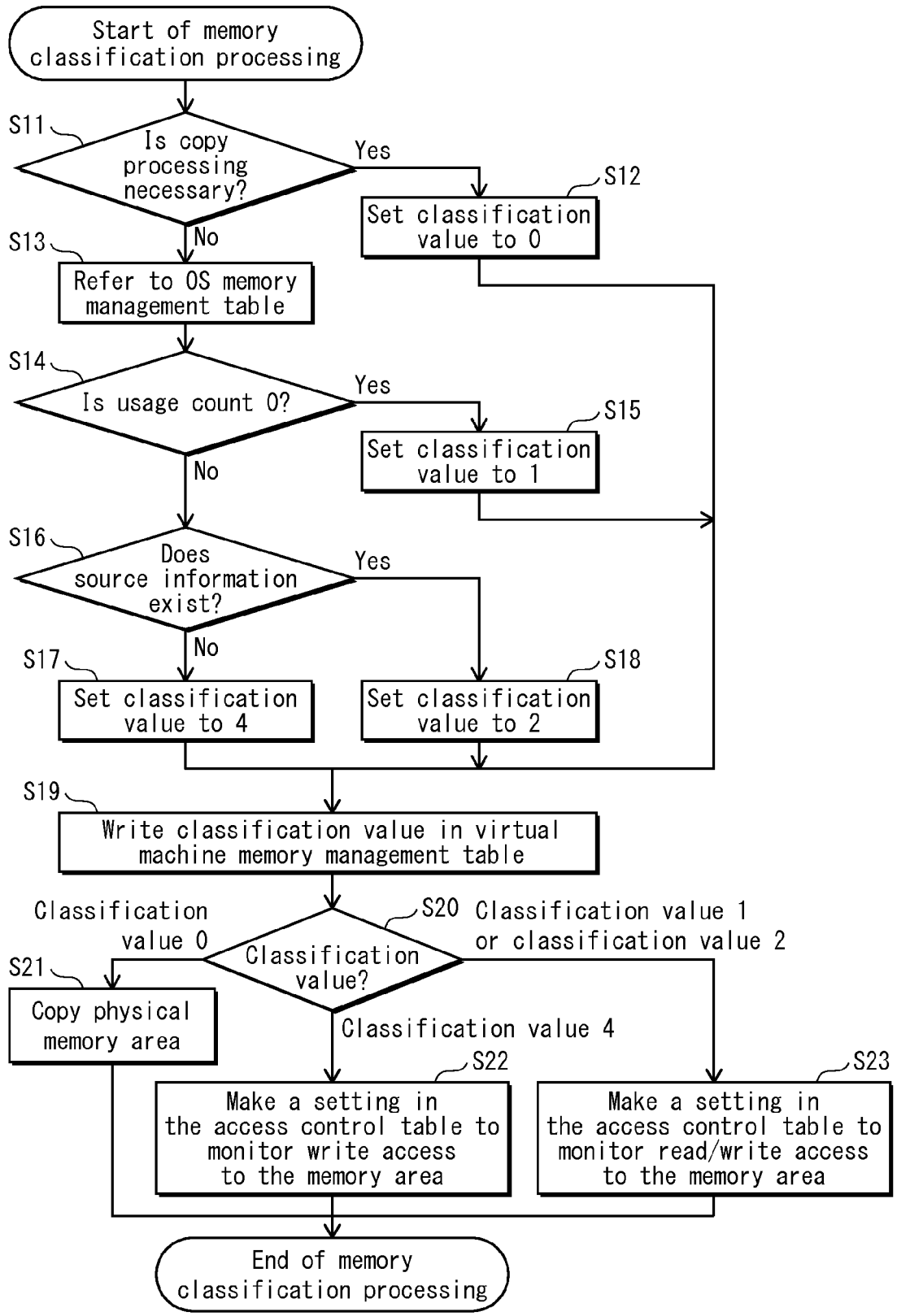
FIG. 11 is a flowchart of memory classification processing by a memory classification unit 21 in the virtual machine system 1.

FIG. 11 is a flowchart of memory classification processing by the memory classification unit 21 in the virtual machine system 1.

The memory classification processing is processing to assign a classification value to each memory area in accordance with the usage status of the memory area by the original virtual machine that is duplicated. When a virtual machine is duplicated, the memory classification unit 21 performs this processing for each memory area allocated to the virtual machine A10.

The memory classification unit 21 determines whether copy processing is necessary for the memory area (step S11). The following describes copy processing. When it is necessary for a memory area allocated to the virtual machine A10 to be allocated only to one virtual machine, then it is necessary to prevent the virtual machine A10 and the virtual machine B50 from sharing the physical memory area corresponding to this memory area after virtual machine duplication. Therefore, in order to prepare physical memory areas for both the virtual machine A10 and the virtual machine B50, a new physical memory area is acquired, and the content of the memory area allocated to the virtual machine A10 is copied into the new physical memory area. It is determined in advance for each memory area whether the memory area needs to be allocated to only one virtual machine.

When copy processing is necessary (step S11: Yes), the memory classification unit 21 sets the classification value to "0" (step S12), sets the classification value in the virtual machine memory management table 311 to "0" (step S19), and issues a request to the memory duplication unit 22 for copy processing of the physical memory area (step S21).

On the other hand, when copy processing is not necessary (step S11: No), the memory classification unit 21 refers to the OS memory management table 14 (see FIG. 5) (step S13). The memory classification unit 21 determines whether the usage count of the memory area is "0" (step S14).

If the usage count is "0" (step S14: Yes), the memory classification unit 21 sets the classification value to "1" (step S15).

On the other hand, if the usage count is not "0" (step S14: No), the memory classification unit 21 determines whether source information for the memory area exists (step S16).

If the source information exists (step S16: Yes), the memory classification unit 21 sets the classification value to "2" (step S18).

On the other hand, if the source information does not exist (step S16: No), the memory classification unit 21 sets the classification value to "4" (step S17).

In step S19, the memory classification unit 21 writes the value into the classification value 311c of the virtual machine memory management table 311 (see FIG. 7). Next, the memory classification unit 21 examines the classification value of the memory area (step S20). If the classification value is "4", the memory classification unit 21 makes a setting in the access control table 310 for the memory area so as to monitor for a write access (step S22). If the classification value is "1" or "2", the memory classification unit 21 makes a setting in the access control table 310 for the memory area so as to monitor for a read access and for a write access (step S23). This completes the memory classification processing.

The memory classification unit 21 performs this memory classification processing for every memory area allocated to the virtual machine A10.

Memory Allocation Processing

Figure 12:
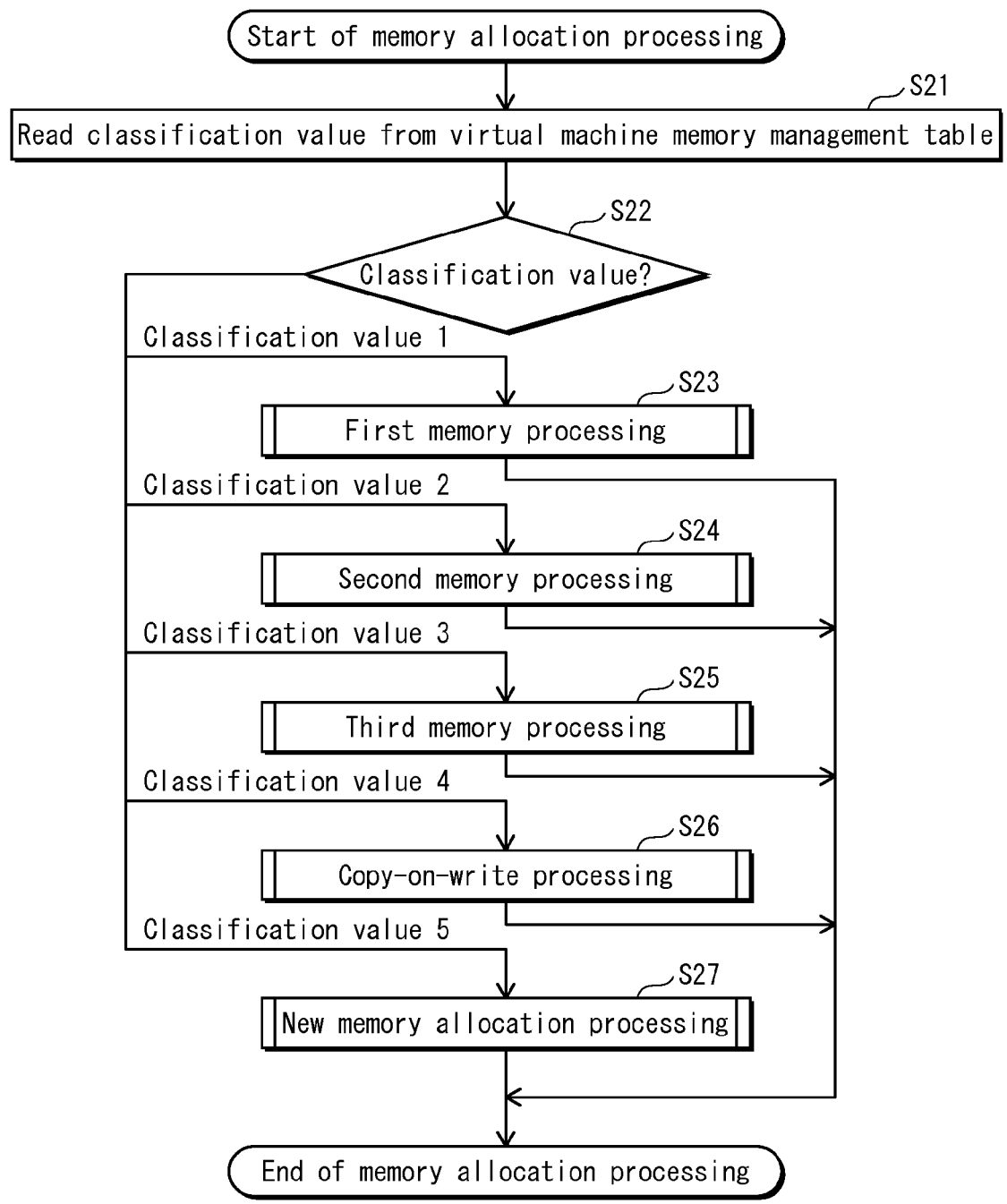
FIG. 12 is a flowchart of memory allocation processing by the memory allocation processing unit 35 in the virtual machine system 1.

FIG. 12 is a flowchart of memory allocation processing by the memory allocation processing unit 35 in the virtual machine system 1.

Memory allocation processing begins after virtual machine duplication when the physical memory 40 is accessed by either of the virtual machines. Specifically, memory allocation processing begins when the memory allocation processing unit 35 receives a memory allocation processing request from the access detection unit 32.

The identifying unit 61 refers to the virtual machine memory management table 311 (see FIG. 7) to read the classification value corresponding to the physical memory area targeted for access (step S21). Next, the identifying unit 61 determines the value of the classification value (step S22). When the classification value is "1" (step S22: classification value 1), the first memory processing unit 63 performs first memory processing (step S23). When the classification value is "2" (step S22: classification value 2), the second memory processing unit 66 performs second memory processing (step S24). When the classification value is "3" (step S22: classification value 3), the third memory processing unit 67 performs third memory processing (step S25). When the classification value is "4" (step S22: classification value 4), the copy-on-write processing unit 62 performs copy-on-write processing (step S26). When the classification value is "5" (step S22: classification value 5), the new memory allocation processing unit 64 performs new memory allocation processing (step S27).

First Memory Processing (Classification Value "1")

Figure 13:
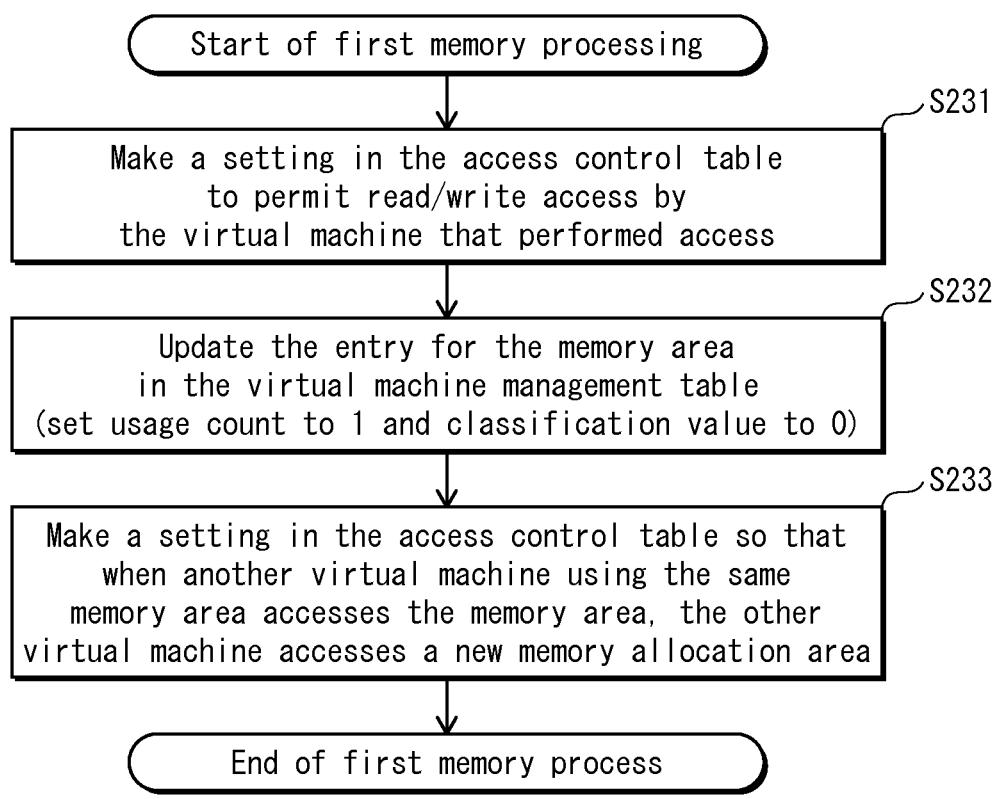
FIG. 13 is a flowchart of the first memory processing by a first memory processing unit 63 in the virtual machine system 1.

FIG. 13 is a flowchart of first memory processing by the first memory processing unit 63 in the virtual machine system 1.

First memory processing begins when information on the virtual machine that performed access, information on the physical memory area targeted for access, and a request for first memory processing arrive from the identifying unit 61.

The first memory processing unit 63 makes a setting in the access control table 310 (see FIG. 8) to stop monitoring of access by the virtual machine that performed access (step S231). This is because it is no longer necessary to detect access, since the memory area that is the target of access subsequently becomes a memory area for exclusive use by the virtual machine that performed access. Next, the first memory processing unit 63 sets the usage count to "1" and the classification value to "0" for the physical memory area that is the target of access in the virtual machine memory management table 311 (step S232). The first memory processing unit 63 then makes a setting in the access control table 310 so that the other virtual machine that is set to refer to the physical memory area accesses the new memory allocation area 41 (step S233). This completes the first memory processing.

FIG. 2 illustrates processing when one of the virtual machines attempts a write access to a physical memory area assigned a classification value of "1", schematically showing first memory processing.

As illustrated in FIG. 2, when a virtual machine first performs a write access to a physical memory area assigned a classification value of "1", a new physical memory area is not acquired. Rather, the virtual machine that performed the access directly writes into the physical memory area that is the target of access. At this point, the virtual machine system 1 sets the other virtual machine to access the new memory allocation area 41. The classification value of the new memory allocation area 41 is "5".

New Memory Allocation Processing (Classification Value "5")

Figure 14:
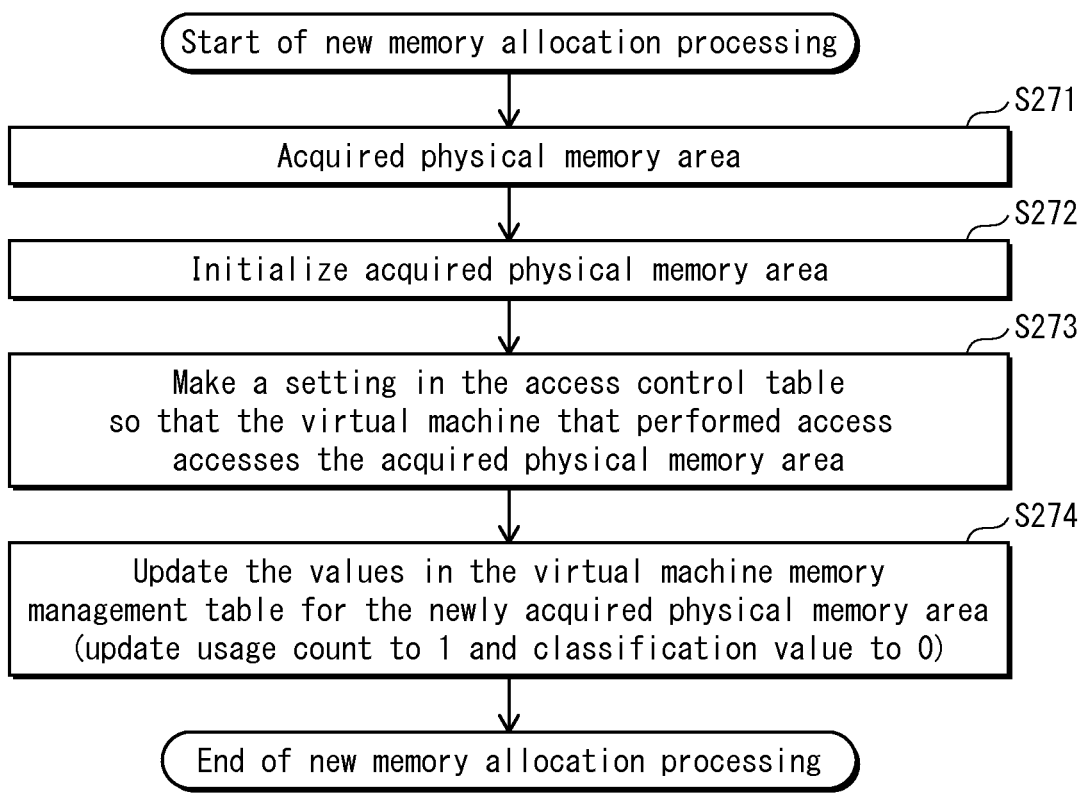
FIG. 14 is a flowchart of the new memory allocation processing by a new memory allocation processing unit 64 in the virtual machine system 1.

FIG. 14 is a flowchart of new memory allocation processing by the new memory allocation processing unit 64 in the virtual machine system 1.

New memory allocation processing begins when information on the virtual machine that performed access and a request for new memory allocation processing are received from the identifying unit 61.

The new memory allocation processing unit 64 issues a request to the memory allocation and release unit 34 to acquire a new physical memory area (step S271). Next, the new memory allocation processing unit 64 invokes the memory initialization processing unit 65 to initialize the acquired physical memory area (step S272). The new memory allocation processing unit 64 makes a setting in the access control table 310 to allocate the newly acquired physical memory area to the accessing virtual machine (step S273). In other words, the address of the newly acquired physical memory area is set in the access control table 310 where the new memory allocation area 41 had been set in the physical memory area 310b. The new memory allocation processing unit 64 then sets the usage count to "1" and the classification value to "0" for the newly acquired physical memory area in the virtual machine memory management table 311 (step S274). This completes the new memory allocation processing.

FIG. 3 illustrates processing when a virtual machine attempts a write access to a memory area assigned a classification value of "5", schematically showing the new memory allocation processing.

As illustrated in FIG. 3, when the other virtual machine accesses the new memory allocation area 41, the virtual machine system 1 acquires a new physical memory area and causes the other virtual machine to write into the acquired physical memory area.

Second Memory Processing (Classification Value "2")

Figure 15:
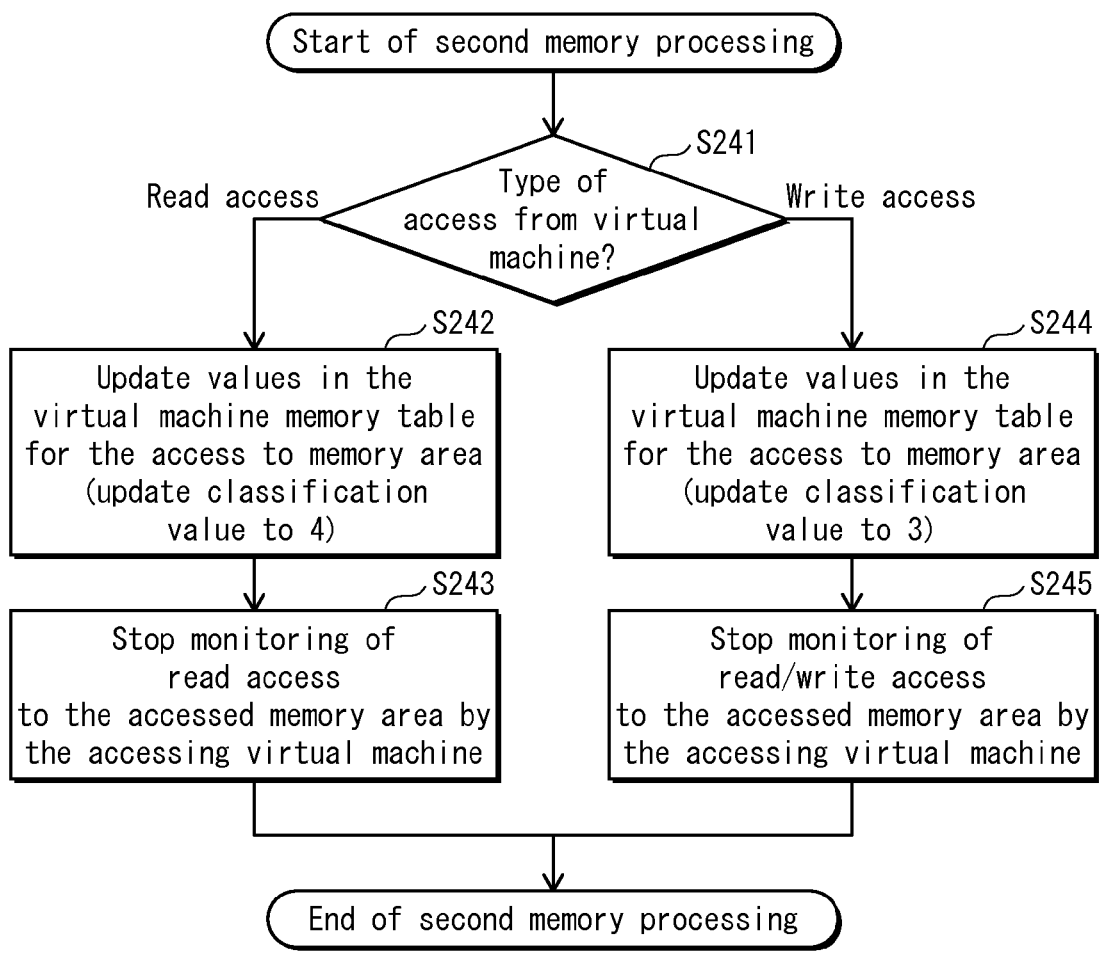
FIG. 15 is a flowchart of the second memory processing by a second memory processing unit 66 in the virtual machine system 1.

FIG. 15 is a flowchart of second memory processing by the second memory processing unit 66 in the virtual machine system 1.

Second memory processing begins when the type of access by the virtual machine, i.e. write access or read access, as well as information on the virtual machine that performed access, information on the physical memory area targeted for access, and a request for second memory processing arrive from the identifying unit 61.

First, the second memory processing unit 66 determines the type of access by the virtual machine (step S241).

In the case of read access (step S241: read access), the second memory processing unit 66 sets the classification value to "4" for the physical memory area that is the target of access in the virtual machine memory management table 311 (step S242). Next, the second memory processing unit 66 makes a setting in the access control table 310 to stop monitoring of read access by the accessing virtual machine (step S243).

On the other hand, in the case of write access (step S241: write access), the second memory processing unit 66 sets the classification value to "3" for the physical memory area that is the target of access in the virtual machine memory management table 311 (step S244). Next, the second memory processing unit 66 makes settings in the access control table 310 to stop monitoring of read/write access by the accessing virtual machine and to monitor read/write access by the other virtual machine 310 (step S245). This completes the second memory processing.

Figure 16:
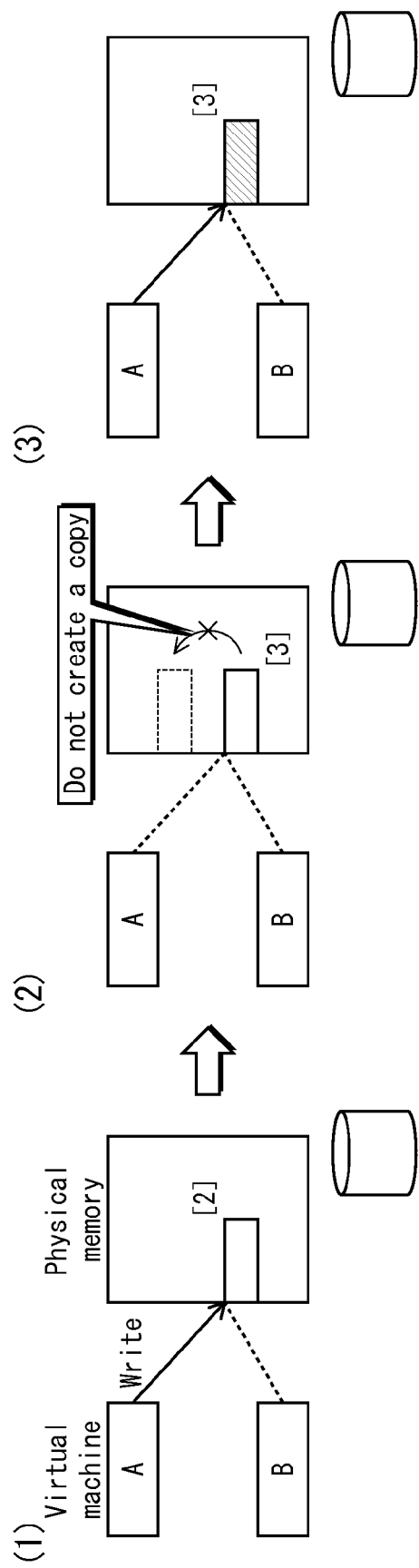
FIG. 16 illustrates processing when a virtual machine attempts a write access to a memory area assigned a classification value of "2", schematically showing the second memory processing.

FIG. 16 illustrates processing when a virtual machine attempts a write access to a memory area assigned a classification value of "2", schematically showing the second memory processing.

As illustrated in FIG. 16, when a virtual machine first performs a write access to a physical memory area assigned a classification value of "2", a new physical memory area is not acquired. Rather, the virtual machine that performed the access directly writes into the physical memory area that is the target of access. The classification value of the physical memory area is updated to "3". While not shown in the figures, when a virtual machine first performs a read access, a new physical memory area is similarly not acquired, and the accessing virtual machine reads directly from the physical memory area that is the target of access. The classification value of the physical memory area is updated to "4".

Third Memory Processing (Classification Value "3")

Figure 17:
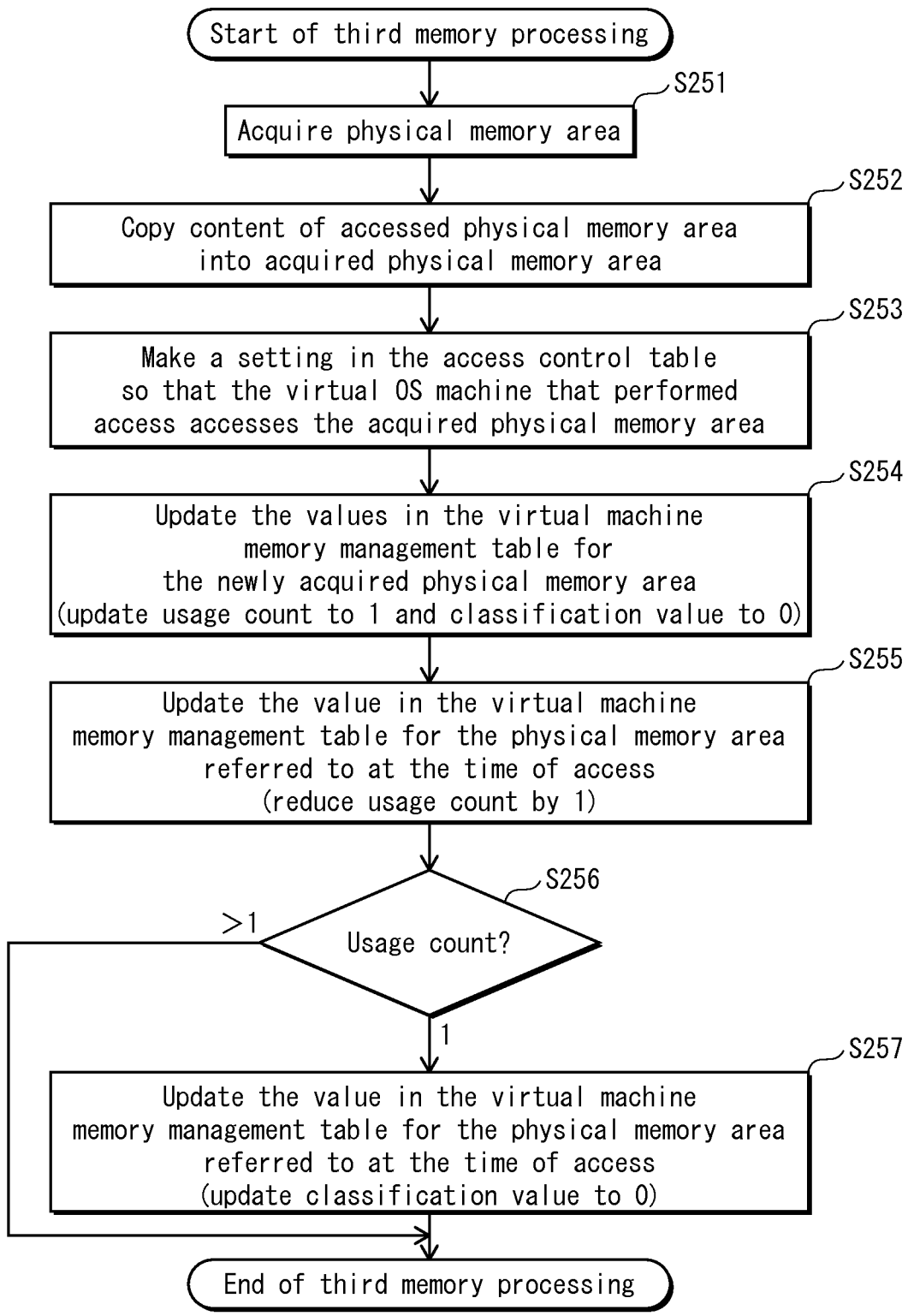
FIG. 17 is a flowchart of third memory processing by a third memory processing unit 67 in the virtual machine system 1.

FIG. 17 is a flowchart of third memory processing by the third memory processing unit 67 in the virtual machine system 1.

Third memory processing begins when information on the virtual machine that performed access, information on the physical memory area targeted for access, and a request for third memory processing arrive from the identifying unit 61.

When a virtual machine performs a read access or a write access, the third memory processing unit 67 issues a request to the memory allocation and release unit 34 to acquire a new physical memory area (step S251). Next, the third memory processing unit 67 copies the content of the physical memory area targeted for access into the acquired physical memory area (step S252). The third memory processing unit 67 then makes a setting in the access control table 310 to allocate the newly acquired physical memory area to the accessing virtual machine (step S253). Next, the third memory processing unit 67 sets the usage count to "1" and the classification value to "0" for the newly acquired physical memory area in the virtual machine memory management table 311 (step S254). The third memory processing unit 67 then reduces the usage count by "1" for the physical memory area that was the source of copying in the virtual machine memory management table 311 (step S255). After being reduced by "1", if the value of the usage count is "1", the third memory processing unit 67 sets the classification value to "0" (step S257). This completes the third memory processing.

Figure 18:
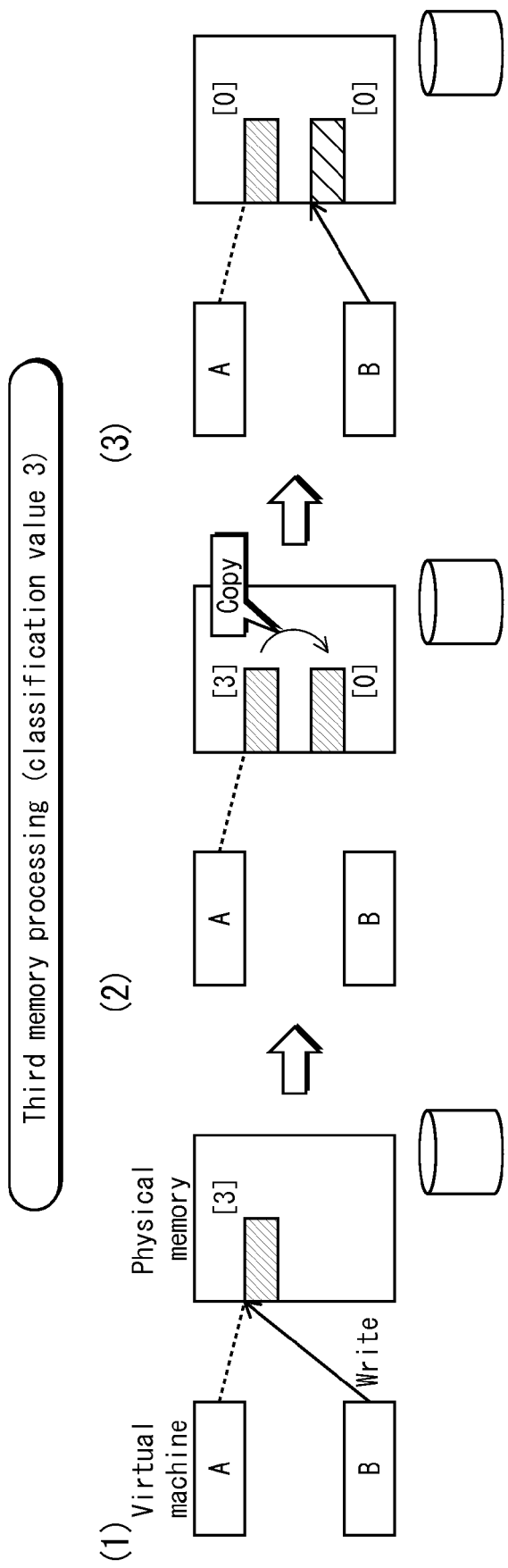
FIG. 18 illustrates processing when a virtual machine attempts a write access to a memory area assigned a classification value of "3", schematically showing the third memory processing.

FIG. 18 illustrates processing when a virtual machine attempts a write access to a memory area assigned a classification value of "3", schematically showing the third memory processing.

As illustrated in FIG. 18, when the other virtual machine attempts a write access to a physical memory area with a classification value of "3", the virtual machine system 1 acquires a new physical memory area and copies the content of the physical memory area targeted for access into the acquired physical memory area. The virtual machine system 1 then causes the accessing virtual machine to write into the acquired physical memory area.

Figure 19:
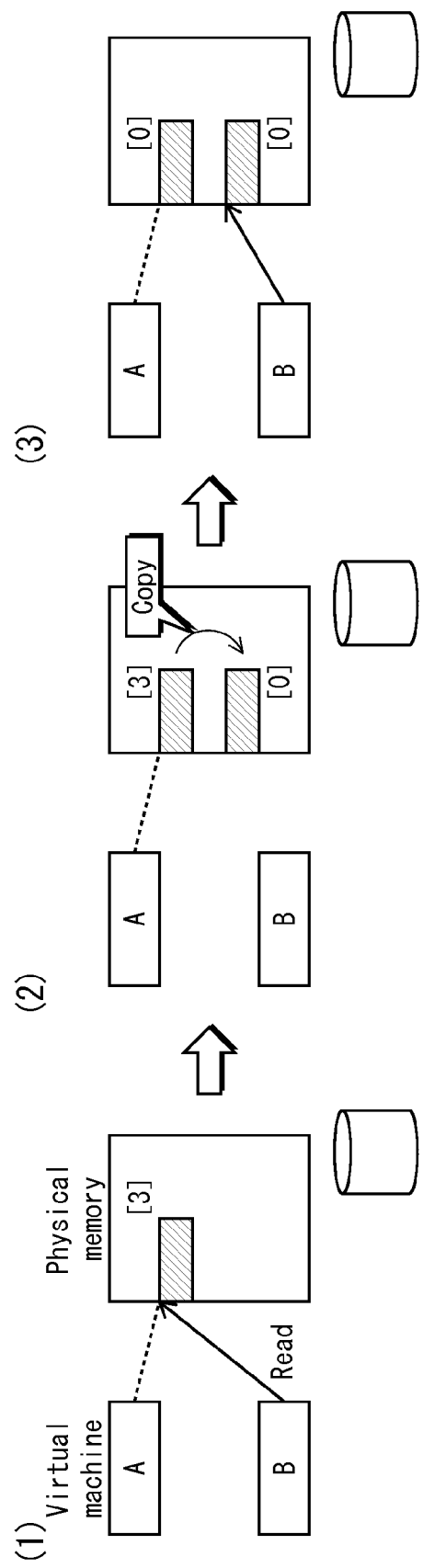
FIG. 19 illustrates processing when a virtual machine attempts a read access to a memory area assigned a classification value of "3", schematically showing the third memory processing.

FIG. 19 illustrates processing when a virtual machine attempts a read access to a memory area assigned a classification value of "3", schematically showing the third memory processing.

As illustrated in FIG. 19, when the other virtual machine attempts a read access to a physical memory area with a classification value of "3", the virtual machine system 1 acquires a new physical memory area and copies the content of the physical memory area targeted for access into the acquired physical memory area. The virtual machine system 1 then causes the content to be read from the physical memory area. Note that in this case, after the content of the memory area is rewritten by a virtual machine, it poses no problem for the other virtual machine to read the rewritten content.

In sum, when duplicating one virtual machine to generate another virtual machine, a new physical memory area is not acquired in Embodiment 1 when one of the virtual machines first performs a write access to the memory area that is unused or for which a source exists, thereby further reducing the amount of memory used as compared to copy-on-write processing.

Furthermore, when read/write access is being monitored for a memory area for which a source exists, then when one of the virtual machines first performs a read access, copy-on-write processing is performed upon subsequent access by the other virtual machine to the memory area. Therefore, after initial read access by one of the virtual machines, no exception is thrown upon read access by the other virtual machine, thereby improving the performance of the virtual machine system.

Embodiment 2

Next, Embodiment 2 of the present invention is described with reference to FIGS. 20 and 21.

Outline

During step S14 of memory classification processing (see FIG. 11), when the usage count is "0" (step S14: Yes), the virtual machine system 1 of Embodiment 1 sets the classification value to "1" (step S15). In other words, even when the usage status of a memory area before duplication of a virtual machine is unused, the physical memory area is not released, but rather is shared by the virtual machine A10 and the virtual machine B50. On the other hand, during memory classification processing, upon determining that the usage status of a memory area is unused, a virtual machine system 1B of Embodiment 2 releases the physical memory area corresponding to the unused memory area. This allows for further reduction of the amount of memory used.

Structure

The structure of the virtual machine system 1B is the same as the structure of the virtual machine system 1. Note that the same reference signs are used for structural elements that are the same as in the virtual machine system 1, and duplicate explanations are omitted.

Operations

Figure 20:
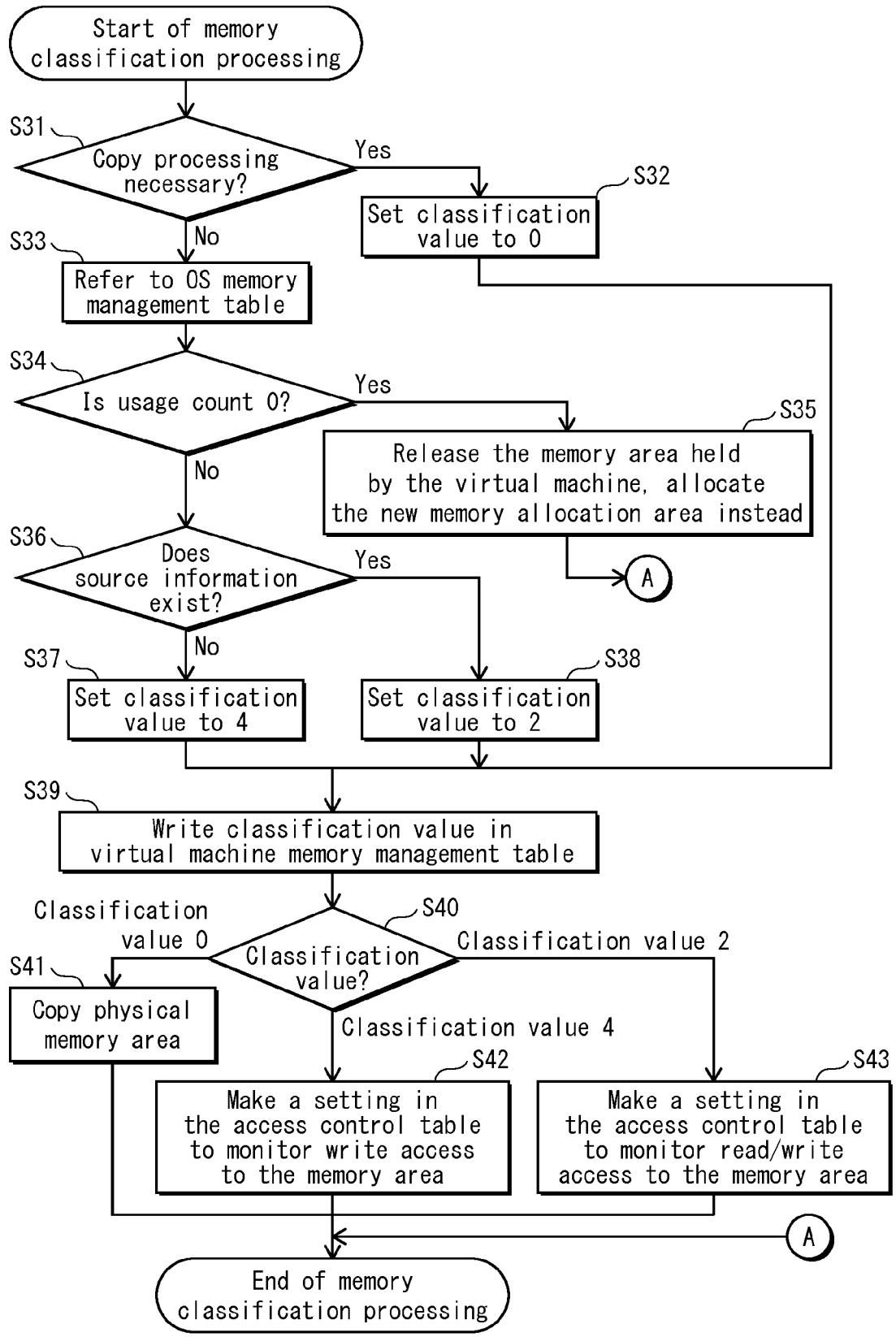
FIG. 20 is a flowchart of memory classification processing by a memory classification unit 21B in a virtual machine system 1B according to Embodiment 2.
Figure 21:
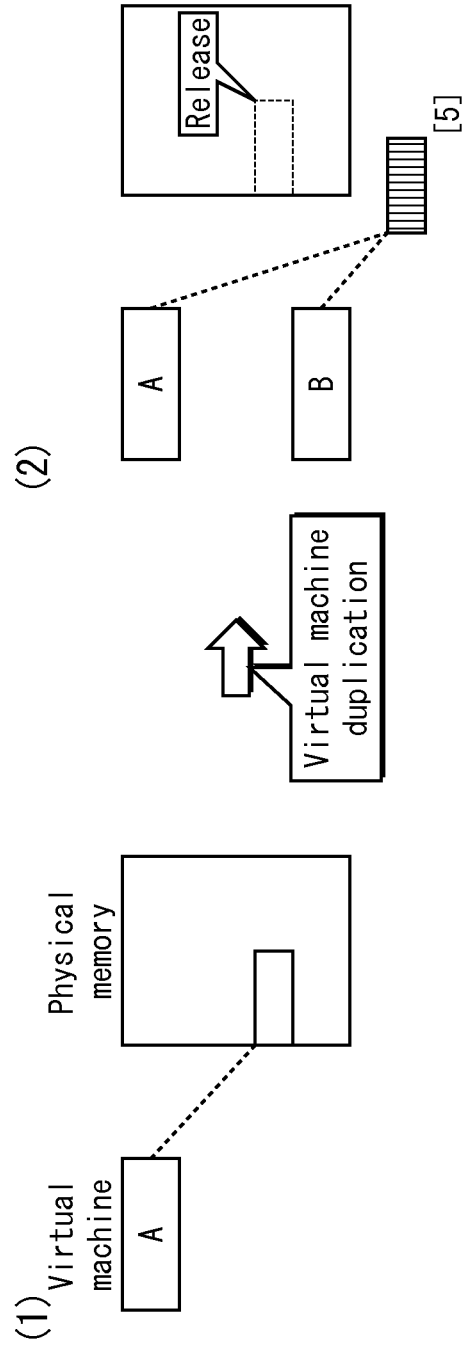
FIG. 21 schematically represents conditions when duplicating a virtual machine in the virtual machine system 1B.

With reference to FIGS. 20 and 21, the following describes operations by the virtual machine system 1B.

FIG. 20 is a flowchart illustrating operations for memory classification processing by a memory classification unit 21B in the virtual machine system 1B. Only the differences from Embodiment 1 are described.

Steps S31 through S34 are the same as steps S11 through S14 (see FIG. 11).

When the usage count is "0" in step S34 (step S34: Yes), then in step S35, the memory classification unit 21B issues a request to the memory allocation and release unit 34 to release the physical memory area corresponding to the memory area. Furthermore, the memory classification unit 21B makes a setting in the access control table 310 so that the memory area corresponds to the new memory allocation area 41, which is assigned a classification value of "5". This completes the memory classification processing.

FIG. 21 schematically represents conditions when duplicating a virtual machine in the virtual machine system 1B.

During virtual machine duplication, upon determining that the usage status of a memory area is unused, the virtual machine system 1B releases the physical memory area corresponding to the unused memory area. Furthermore, the memory classification unit 21B associates the unused memory area with the new memory allocation area 41, which is assigned a classification value of "5". Subsequently, when one of the virtual machines accesses the new memory allocation area 41, the virtual machine system 1B performs new memory allocation processing, as illustrated in FIG. 3.

In sum, during virtual machine duplication, Embodiment 2 releases every physical memory area corresponding to a memory area that is unused by a virtual machine.

Embodiment 3

Next, Embodiment 3 of the present invention is described with reference to FIGS. 22 through 26.

Outline

Typically, when an application or the like on a virtual machine ceases to use a logical memory area, the virtual OS releases the logical memory area (for example, by deleting memory management information listing the application and the logical memory area in correspondence), and the logical memory area is added to a free memory list for managing logical memory areas unused by the virtual machine. However, the physical memory area corresponding to the logical memory area is not released, but rather remains allocated to the virtual machine.

When detecting that the virtual OS has accessed the free memory list in order to release a logical memory area, a virtual machine system 1C according to Embodiment 3 releases the physical memory area corresponding to the logical memory area, thereby immediately releasing the physical memory area for the virtual machine. Embodiment 3 therefore improves the efficiency of use of physical memory areas.

Structure

Figure 22:
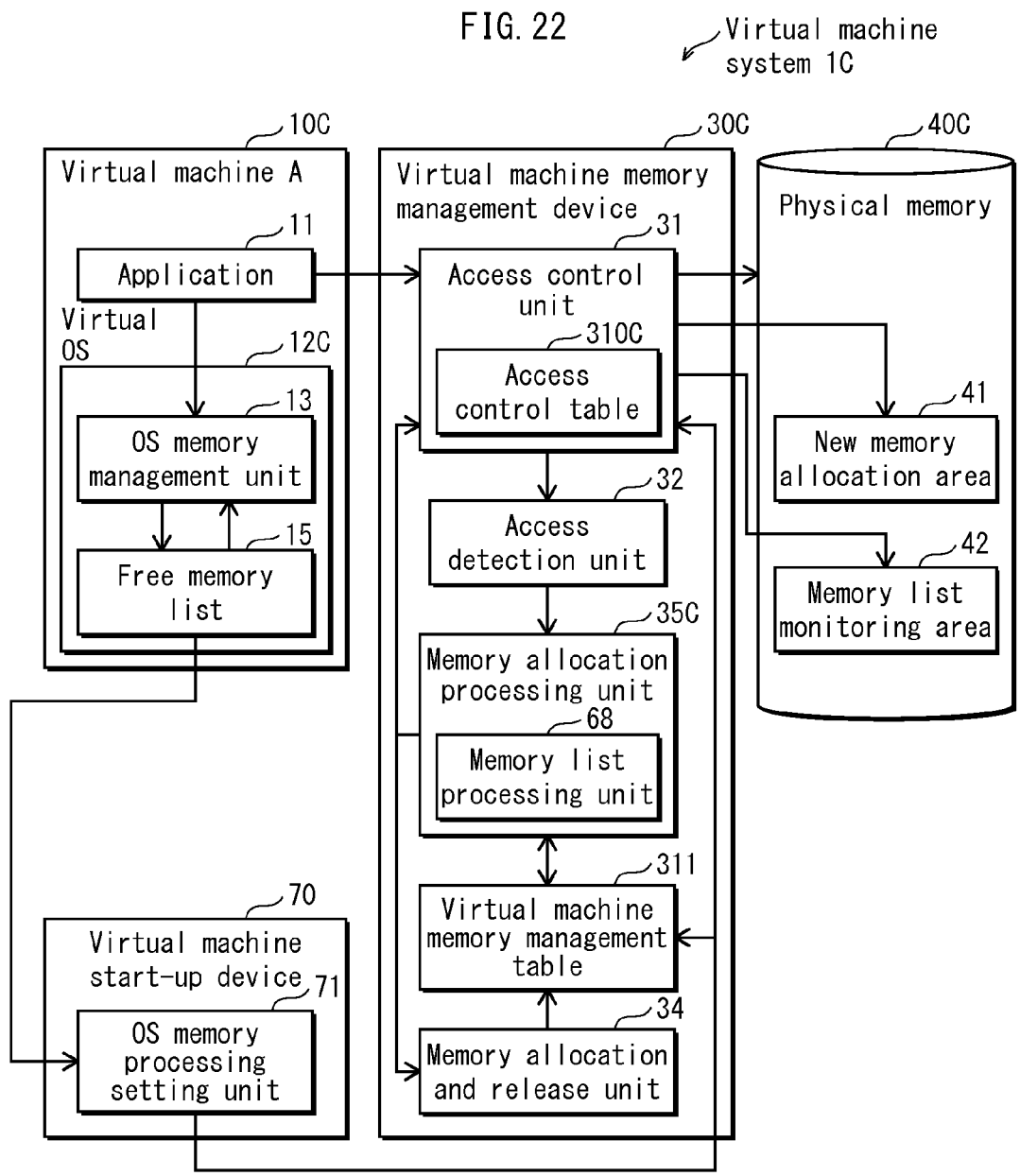
FIG. 22 is a functional structure diagram of a virtual machine system 1C according to Embodiment 3.

Next, with reference to FIG. 22, the structure of the virtual machine system 1C is described.

FIG. 22 is a functional structure diagram of the virtual machine system 1C according to Embodiment 3. Note that the same reference signs are used for structural elements that are the same as in the virtual machine system 1, and duplicate explanations are omitted.

The virtual machine system 1C is provided with a free memory list 15 for a virtual machine A10C, a virtual machine start-up device 70, a memory list processing unit 68 in a virtual machine memory management device 30C, and a memory list monitoring area 42 in a physical memory 40C.

The free memory list 15 is management information for managing free memory areas on the virtual machine. For example, the free memory list 15 is a list of information (addresses or the like) identifying each unused logical memory area among the logical memory areas of the virtual machine A10C.

Figures 23, 24:
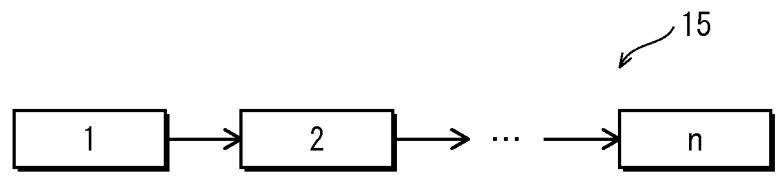
FIG. 23 illustrates an example of a free memory list 15.
FIG. 24 illustrates an example after an OS memory processing setting unit 71 updates an access control table 310C upon start-up of a virtual machine A10C.

FIG. 23 illustrates an example of the free memory list 15. The pieces of data "1", "2", . . . , "n" in this list are each an address of an unused logical memory area on the virtual machine A10C. In the present embodiment, when allocating or releasing a logical memory area, the OS memory management unit 13 always accesses the free memory list 15. Upon receiving a request from the application 11 for release of a logical memory area, the OS memory management unit 13 accesses the free memory list 15 and includes the logical memory area indicated by the application 11 in the free memory list 15. Upon receiving a request from the application 11 for allocation of a logical memory area, the OS memory management unit 13 accesses the free memory list 15, acquires an unused logical memory area from the free memory list 15, and allocates the logical memory area to the application 11.

The virtual machine start-up device 70 is provided with an OS memory processing setting unit 71. The OS memory processing setting unit 71 is invoked when the virtual machine A10C starts up and performs access control setting processing. The OS memory processing setting unit 71 performs access control setting processing by making a setting in an access control table 310C for a predetermined logical memory area stored in the free memory list 15 so that access to that memory area results in access to the memory list monitoring area 42.

FIG. 24 illustrates an example after the OS memory processing setting unit 71 updates the access control table 310C upon start-up of the virtual machine A10C.

The "free memory list area" entry in the logical memory area 310a is, for example, the initial logical address of the free memory list 15. So that access to this logical address results in access to the memory list monitoring area 42, a "memory list monitoring area" is set in the corresponding physical memory area 310b.

Like the new memory allocation area 41, the memory list monitoring area 42 exists as a portion of the physical memory 40. As illustrated in FIG. 24, access by the virtual machine to this memory list monitoring area 42 is monitored, since the access authorization is set to "R/W prohibited". Upon detecting access to the memory list monitoring area 42, the access control unit 31 notifies the access detection unit 32. At this point, the access detection unit 32 is configured to invoke the memory list processing unit 68 in a memory allocation processing unit 35C, described below. The access control unit 31 receives information on access by the virtual machine to the free memory list 15 and transmits this information to the access detection unit 32. This information on access to the free memory list 15 allows for a determination of whether the virtual machine is attempting to release or to allocate a memory area. For example, when this information is a request for processing linked to an address value and the free memory list 15, it is determined that the virtual machine is attempting to release a memory area. On the other hand, when this information is a request for processing to acquire a memory area from the free memory list 15, it is determined that the virtual machine is attempting to allocate a memory area.

The memory list processing unit 68 receives the information on access to the free memory list 15 from the access detection unit 32 and determines whether the virtual machine is attempting to release or to allocate a memory area. Upon determining that the virtual machine is attempting to release a memory area, the memory list processing unit 68 transmits, to the memory allocation and release unit 34, a physical memory area corresponding to the logical memory area to be released and instructs the memory allocation and release unit 34 to release the physical memory area. Upon determining that the virtual machine is attempting to allocate a memory area, the memory list processing unit 68 instructs the memory allocation and release unit 34 to allocate a physical memory area.

Operations

Figure 25:
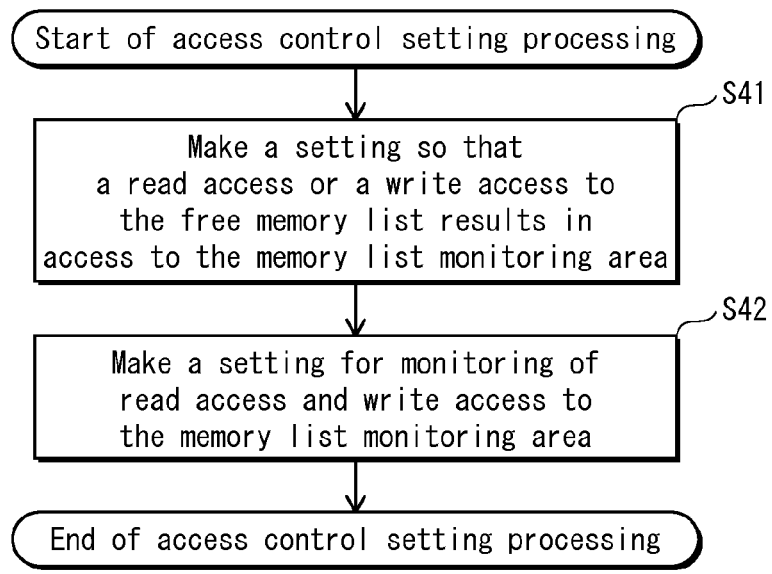
FIG. 25 is a flowchart of access control setting processing by the OS memory processing setting unit 71 in the virtual machine system 1C.
Figure 26:
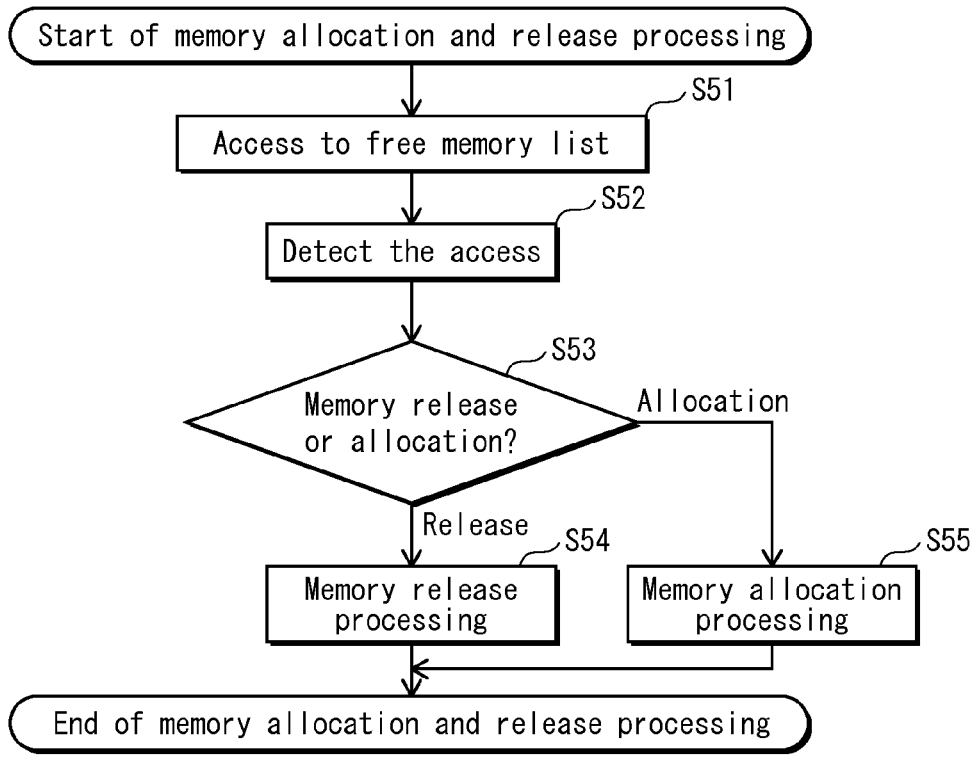
FIG. 26 is a flowchart of memory allocation and release processing by the virtual machine system 1C.

With reference to FIGS. 25 and 26, the following describes operations by the virtual machine system 1C (having the structure in FIG. 22).

FIG. 25 is a flowchart of access control setting processing by the OS memory processing setting unit 71 in the virtual machine system 1C.

This processing begins upon start-up of the virtual machine.

First, the OS memory processing setting unit 71 makes a setting in the access control table 310C so that a read access or a write access to the free memory list 15 results in access to the memory list monitoring area 42 (step S41). Next, the OS memory processing setting unit 71 makes a setting in the access control table 310 for monitoring of read access and write access to the memory list monitoring area 42 (step S42). This completes the access control setting processing.

FIG. 26 is a flowchart of memory allocation and release processing by the virtual machine system 1C.

This processing is performed when the virtual machine system 1C allocates or releases a physical memory area for a virtual machine.

First, the OS memory management unit 13 accesses the free memory list 15 (step S51). Next, the access control unit 31 detects the access and notifies the access detection unit 32 (step S52). Having been invoked by the access detection unit, the memory list processing unit 68 determines whether the access is to release or to allocate a memory area (step S53). When the access is to release a memory area (step S53: release), the memory allocation and release unit 34 performs memory release processing (step S54). The memory allocation and release unit 34 performs the memory release processing by receiving the physical memory area that is the target for release from the memory list processing unit 68, and reducing the usage count corresponding to the physical memory area in the virtual machine memory management table 311 by "1". As a result, if the usage count becomes "0", the physical memory area has been released and becomes unused. When the access is to allocate a memory area (step S53: allocate), the memory allocation and release unit 34 performs memory allocation processing (step S55). The memory allocation and release unit 34 performs the memory allocation processing by referring to the virtual machine memory management table 311 to search for a released, unused physical memory area (whose usage count is "0"), setting the physical memory area to be in use by adding "1" to the corresponding usage count, and transmitting the logical memory area corresponding to the physical memory area to the virtual OS 12C. This completes the memory allocation and release processing.

In Embodiment 3, when it is detected that the virtual OS has accessed the free memory list in order to release a logical memory area, the physical memory area corresponding to the logical memory area is released, thereby immediately releasing the physical memory area for the virtual machine. Embodiment 3 therefore improves the efficiency of use of physical memory areas.

Supplementary Explanation

While the virtual machine system according to the present embodiment has been described based on embodiments thereof, modifications that do not depart from the intent of the present invention may be made. For example, the following modifications are possible. The present invention is therefore not limited to the virtual machine system exactly as illustrated in the above embodiments.

(1) In the embodiments, the usage status of a memory area is information on whether the memory area is being used by an application, a driver, or the like and includes an indication of whether a source exists for the information stored in the memory area, but the usage status of the memory area is not limited in this way. For example, information may be included on whether the memory area may be used by an application other than the application currently using the memory area.

In this case, a private memory flag is provided in the OS memory management table 14 (see FIG. 5). The private memory flag stores a value of "1" when the memory area may only be used by the application currently using the memory area, and otherwise stores a value of "0". When the value of the private memory flag is "1", the usage status of the memory area may be set to "no source" as described in Embodiment 1. When the value of the private memory flag is "0", the usage status of the memory area may be set to "source exists".

(2) In the embodiments, in step S11 of the memory classification processing (see FIG. 11), it is determined whether copy processing is necessary for the memory area, but the memory classification processing may instead be as follows. Before duplication of a virtual machine, a value of "1" may be set in the usage count 311*b* and a value of "0" in the classification value 311*c* of the virtual machine memory management table 311 (see FIG. 7) for memory areas that need to be allocated only to one virtual machine. By doing so, the determination in step S11 of the memory classification processing may be omitted, thereby increasing processing efficiency.

(3) In the embodiments, as illustrated in the flowchart of FIG. 14, the new memory allocation processing unit 64 invokes the memory initialization processing unit 65 in step S272 of the new memory allocation processing to initialize the acquired physical memory area. If the virtual machine that receives allocation of the memory area is secure, however, initialization need not be performed. This contributes to a reduction in processing. For example, the virtual machine that was originally using the physical memory area that was allocated may be determined, and when this virtual machine is the same as the virtual machine that receives the allocation, initialization may be omitted.

(4) As illustrated in FIG. 19, in the embodiments, when the other virtual machine attempts a read access to a physical memory area with a classification value of "3", the virtual machine system 1 acquires a new physical memory area and copies the content of the physical memory area targeted for access into the acquired physical memory area. The virtual machine system 1 then causes the content to be read from the physical memory area. Alternatively, the content of the memory area before a write access by a virtual machine may be read from a location storing the content (for example, a storage) into the newly acquired physical memory area, and the other accessing virtual machine may read the content from the physical memory area.

(5) In the embodiments, as illustrated in FIG. 23, a list is used as the management information for managing free memory areas in a virtual machine, but the management information is not limited in this way. Any type of management information is acceptable, as long as the information is for managing free memory areas and is always accessed by the virtual OS upon releasing a memory area. For example, management information for managing free memory areas may use a so-called bitmap method or memory map method. The access control unit 31 is configured to detect access by the virtual OS to such management information.

(6) The virtual machine system 1 according to the embodiments may be combined with a portion or all of the above modifications (1) through (5).

(7) As another embodiment of the present invention, the following describes the structure of a virtual machine system and modifications thereto, as well as the advantageous effects achieved thereby.

(a) A virtual machine system according to an aspect of the present invention is for duplicating a first virtual machine to generate one or more second virtual machines and comprises: a management unit configured to manage each memory area among one or more memory areas accessible by the first virtual machine so that after generation of the one or more second virtual machines, every virtual machine is permitted to perform a read access to the memory area until any virtual machine among the first virtual machine and the one or more second virtual machines performs a write access to the memory area; a determination unit configured to determine whether the memory area is a specific memory area whose content before the write access needs to be stored, when the write access to the memory area is performed, for subsequent access by a virtual machine other than the virtual machine performing the write access; a first detection unit configured to detect the write access to the specific memory area; a second detection unit configured to detect, after the first detection unit detects the write access, that a virtual machine other than the virtual machine performing the write access is attempting access to the specific memory area; and a memory allocation unit configured to acquire a new memory area and allocate the new memory area, as a target of the access, to the virtual machine attempting access to the specific memory area as detected by the second detection unit.

When duplicating one virtual machine to generate another virtual machine, this virtual machine system does not acquire a new physical memory area when one of the virtual machines first performs a write access to the memory area that is unused or for which a source exists, thereby further reducing the amount of memory used as compared to copy-on-write processing.

Furthermore, in a virtual machine system in which virtual machines are generated and deleted dynamically, unnecessary acquisition of a memory area is prevented when the memory area is only used by either a dynamically generated virtual machine or the original virtual machine, thereby reducing the overall memory amount of the physical memory areas that are used.

(b) The determination unit may make the determination based on information indicating a usage status of each memory area in use by the first virtual machine when the first virtual machine is duplicated to generate the one or more second virtual machines.

This virtual machine system determines whether a memory area is a specific memory area based on the usage status of each memory area in use by the original virtual machine that is duplicated. Therefore, this virtual machine system can cause virtual machines to operate without allocation of unnecessary memory areas, even when causing the virtual machines to operate by generating the virtual machines dynamically.

(c) The information indicating the usage status may indicate, for each memory area, whether the memory area is unused and is accessed after being initialized. The determination unit may determine that the memory area is the specific memory area when the memory area is both unused and is initialized upon being accessed.

This virtual machine system distinguishes between whether or not the usage status of each memory area in use by the original virtual machine that is duplicated indicates, for each memory area, whether the memory area is unused and accessed after being initialized. Therefore, this virtual machine system prevents unnecessary acquisition of these memory areas, thereby reducing the overall memory amount of the physical memory areas that are used.

(d) The information indicating the usage status may indicate, for each memory area, whether a same content as a content of the memory area is stored in an external storage unit. The determination unit may determine that the memory area is the specific memory area when the memory area has the same content as the external storage unit.

This virtual machine system distinguishes between whether or not the usage status of each memory area in use by the original virtual machine that is duplicated indicates, for each memory area, whether the same content as the content of the memory area is stored in an external storage unit. Therefore, this virtual machine system prevents unnecessary acquisition of these memory areas, thereby reducing the overall memory amount of the physical memory areas that are used.

(e) The determination unit may determine that the memory area is the specific memory area when a content of the memory area upon initial access by any virtual machine among the first virtual machine and the one or more second virtual machines is allowed to be a content after a write access by a virtual machine other than the virtual machine performing the initial access.

This virtual machine system determines that the memory area is the specific memory area when the usage status of each memory area in use by the original virtual machine that is duplicated indicates that a content of the memory area upon initial access by any virtual machine among the first virtual machine and the one or more second virtual machines is allowed to be a content after a write access by a virtual machine other than the virtual machine performing the initial access. Therefore, this virtual machine system prevents unnecessary acquisition of these memory areas, thereby reducing the overall memory amount of the physical memory areas that are used.

(f) The information indicating the usage status may indicate, for each memory area, whether the memory area is unused. The virtual machine system may further comprise: a second determination unit configured to determine, based on the information, whether each memory area, allocated to the first virtual machine when the first virtual machine is duplicated to generate the one or more second virtual machines, is unused; and a memory allocation and release unit configured to make a setting, for a memory area determined by the second determination unit to be unused, allowing for detection of access to the memory area by any virtual machine among the first virtual machine and the one or more second virtual machines, to release a physical counterpart of the memory area, and when access by a virtual machine to the memory area whose physical counterpart was released is subsequently detected, to allocate the physical counterpart of the memory area to the virtual machine.

During virtual machine duplication, this virtual machine system releases every physical memory area corresponding to a memory area that is unused by a virtual machine.

(g) The virtual machine system may further comprise: a third detection unit configured to detect access, by a virtual OS on a virtual machine, to a memory area storing management information for managing free memory areas of the virtual machine, the access being for release of a memory area; and a memory release unit configured to release, when the third detection unit detects the access, the physical counterpart of the memory area that the virtual OS is accessing for release.

When detecting that the virtual OS has accessed the free memory list in order to release a logical memory area, this virtual machine system releases the physical memory area corresponding to the logical memory area, thereby immediately releasing the physical memory area for the virtual machine. This virtual machine system therefore improves the efficiency of use of physical memory areas.

(8) The memory classification unit 21, the memory duplication unit 22, the access control unit 31, the access detection unit 32, the memory allocation and release unit 34, the memory allocation unit 35, the memory list processing unit 68, and the OS memory processing setting unit 71 operate in accordance with a memory management program that causes a computer in the virtual machine system 1 to function as each of these functional units. Each of the functional units described in the embodiments may also be implemented as a hardware circuit, such as an IC (Integrated Circuit) or LSI (Large Scale Integration).

The memory management program may be circulated and distributed on a variety of recording media or over communication channels. The distributed program is used by being stored on a memory or the like that is readable by the CPU of a device and is executed by the CPU in order to achieve the various functions of the virtual machine system described in the embodiments.

(9) In the embodiments, the steps in the flowcharts illustrate examples of steps performed chronologically in the order listed, but these steps need not always be performed chronologically. The present invention includes the case of performing steps in parallel or in isolation.

(10) The present invention may be adopted in any computing machine that is a calculating device provided with a processor and a timer (for example, an electronic device, and information device, an AV device, a communications device, a household electrical appliance, or the like). Specifically, the present invention may be adopted in a personal computer; a cellular telephone, such as a smart phone or a PDA; a hard disk recorder; a disc recorder using a DVD, Blu-Ray disc, or the like; a disc player using a DVD, Blu-Ray disc, or the like; a car navigation system; a television; or the like.

(11) The management unit of the present invention corresponds to the access control unit 31 of the embodiments. The determination unit of the present invention corresponds to the memory classification unit 21 and the OS memory management table 14 of the embodiments. The specific memory area of the present invention corresponds to when the usage status of a memory area of the embodiments is "unused" or "source exists". The first detection unit of the present invention corresponds to the access control unit 31, the access detection unit 32, the memory allocation processing unit 35, and the virtual machine memory management table 311 of the embodiments. The second detection unit of the present invention corresponds to the access control unit 31, the access detection unit 32, the memory allocation processing unit 35, and the virtual machine memory management table 311 of the embodiments. The memory allocation unit of the present invention corresponds to the memory allocation and release unit 34 and the virtual machine memory management table 311 of the embodiments.

The second determination unit of the present invention corresponds to the memory classification unit 21 and the OS memory management table 14 of the embodiments. The memory allocation and release unit of the present invention corresponds to the memory allocation and release unit 34, the memory allocation processing unit 35, and the virtual machine memory management table 311 of the embodiments.

The third detection unit of the present invention corresponds to the OS memory processing setting unit 71 and the access control unit 31 of the embodiments. The memory release unit of the present invention corresponds to the memory list processing unit 68 and the virtual machine memory management table 311 of the embodiments.

INDUSTRIAL APPLICABILITY

A virtual machine system according to the present invention prevents the unnecessary acquisition of the physical memory area by copy-on-write processing. In relation to a virtual machine system, in particular in a system in which an operating system (OS) is generated as needed and caused to operate as the execution environment for application programs, the present invention is, for example, useful in techniques for reducing the amount of memory used.

REFERENCE SIGNS LIST 1 virtual machine system
10 virtual machine A
11 application
12 virtual OS
13 OS memory management unit
14 OS memory management table
15 free memory list
20 virtual machine duplication device
21 memory classification unit
22 memory duplication unit
30 virtual machine memory management device
31 access control unit
32 access detection unit
34 memory allocation and release unit
35 memory allocation processing unit
40 physical memory
41 new memory allocation area
42 memory list monitoring area
50 virtual machine B
61 identifying unit
62 copy-on-write processing unit
63 first memory processing unit
64 new memory allocation processing unit
65 memory initialization processing unit
66 second memory processing unit
67 third memory processing unit
68 memory list processing unit 70 virtual machine start-up device
71 OS memory processing setting unit
201 classification value table
310 access control table
311 virtual machine memory management table

The invention claimed is:

1. A virtual machine system for duplicating a first virtual machine to generate one or more second virtual machines, the virtual machine system comprising:
   a processor; and
   a non-transitory memory having stored thereon executable instructions, which when executed by the processor, cause the processor to perform:
      managing a memory area among one or more memory areas accessible by the first virtual machine so that, after generation of the one or more second virtual machines, each of the first virtual machine and the one or more second virtual machines is permitted to perform a read access to the memory area until any virtual machine among the first virtual machine and the one or more second virtual machines performs a first write access to the memory area;
      determining whether the memory area is a specific memory area whose content before the first write access does not need to be stored based on a classification value which is a value for identifying content of memory allocation processing, when the first write access to the memory area is performed, for a subsequent access by a virtual machine other than the any virtual machine performing the first write access;
      detecting the first write access to the specific memory area;
      detecting, after the first write access to the specific memory area is detected, that the virtual machine other than the any virtual machine performing the first write access is attempting the subsequent access to the specific memory area; and
      (i) acquiring a new memory area, (ii) copying, into the new memory area, content of the specific memory area before the attempted subsequent access to the specific memory area by the virtual machine attempting the subsequent access to the specific memory area, and (iii) allocating the new memory area, as a target of the attempted subsequent access, to the virtual machine attempting the subsequent access to the specific memory area.

2. The virtual machine system of claim 1, wherein
the memory area is determined to be the specific memory area based on information indicating a usage status of each memory area in use by the first virtual machine when the first virtual machine is duplicated to generate the one or more second virtual machines.

3. The virtual machine system of claim 2, wherein
the information indicating the usage status indicates, for each memory area, whether the memory area is unused and is accessed after being initialized, and
the memory area is determined to be the specific memory area when the memory area is both unused and is initialized upon being accessed.

4. The virtual machine system of claim 2, wherein
the information indicating the usage status indicates, for each memory area, whether a same content as a content of the memory area is stored in an external storage,
the memory area is determined to be the specific memory area when the memory area has the same content as the external storage.

5. The virtual machine system of claim 2, wherein
the memory area is determined to be the specific memory area when a content of the memory area upon initial access by any virtual machine among the first virtual machine and the one or more second virtual machines is allowed to be a content after a write access by a virtual machine other than the virtual machine performing the initial access.

6. The virtual machine system of claim 2, wherein
the information indicating the usage status indicates, for each memory area, whether the memory area is unused, and
the executable instructions, which when executed by the processor, further cause the processor to perform:
   determining, based on the information, whether each memory area, allocated to the first virtual machine when the first virtual machine is duplicated to generate the one or more second virtual machines, is unused; and
   (i) making a setting, for a memory area determined to be unused, allowing for detection of access to the memory area by any virtual machine among the first virtual machine and the one or more second virtual machines, (ii) releasing a physical counterpart of the memory area, and when access by a virtual machine to the memory area whose physical counterpart was released is subsequently detected, (iii) allocating the physical counterpart of the memory area to the virtual machine.

7. The virtual machine system of claim 6, wherein the executable instructions, which when executed by the processor, further cause the processor to perform:
   detecting access, by a virtual OS on a virtual machine, to a memory area storing management information for managing free memory areas of the virtual machine, the access being for release of a memory area; and
   releasing, when the access to the memory area storing the management information is detected, the physical counterpart of the memory area that the virtual OS is accessing for release.

8. A memory management method for a virtual machine system that duplicates a first virtual machine to generate one or more second virtual machines, the memory management method comprising:
   managing a memory area among one or more memory areas accessible by the first virtual machine so that after generation of the one or more second virtual machines, each of the first virtual machine and the one or more second virtual machines is permitted to perform a read access to the memory area until any virtual machine among the first virtual machine and the one or more second virtual machines performs a first write access to the memory area;
   determining whether the memory area is a specific memory area whose content before the first write access does not need to be stored based on a classification value which is a value for identifying content of memory allocation processing, when the first write access to the memory area is performed, for a subsequent access by a virtual machine other than the any virtual machine performing the first write access;
   detecting the first write access to the specific memory area;
   detecting, after the first write access to the specific memory area is detected, that the virtual machine other than the any virtual machine performing the first write access is attempting the subsequent access to the specific memory area; and (i) acquiring a new memory area, (ii) copying, into the new memory area, content of the specific memory area before the attempted subsequent access to the specific memory area by the virtual machine attempting the subsequent access to the specific memory area, and (iii) allocating the new memory area, as a target of the attempted subsequent access, to the virtual machine attempting the subsequent access to the specific memory area.

9. A non-transitory computer readable recording medium having stored thereon a memory management program for a virtual machine system on a computer, the virtual machine system duplicating a first virtual machine to generate one or more second virtual machines, the memory management program causing the computer to perform:

managing a memory area among one or more memory areas accessible by the first virtual machine so that after generation of the one or more second virtual machines, each of the first virtual machine and the one or more second virtual machines is permitted to perform a read access to the memory area until any virtual machine among the first virtual machine and the one or more second virtual machines performs a first write access to the memory area;

determining whether the memory area is a specific memory area whose content before the first write access does not need to be stored based on a classification value which is a value for identifying content of memory allocation processing, when the first write access to the memory area is performed, for a subsequent access by a virtual machine other than the any virtual machine performing the first write access;

detecting the first write access to the specific memory area;

detecting, after the first write access to the specific memory area is detected, that the virtual machine other than the any virtual machine performing the first write access is attempting the subsequent access to the specific memory area; and (i) acquiring a new memory area, (ii) copying, into the new memory area, content of the specific memory area before the attempted subsequent access to the specific memory area by the virtual machine attempting the subsequent access to the specific memory area, and (iii) allocating the new memory area, as a target of the attempted subsequent access, to the virtual machine attempting the subsequent access to the specific memory area.

10. An integrated circuit constituting a virtual machine system for duplicating a first virtual machine to generate one or more second virtual machines, the integrated circuit comprising:

a processor; and a non-transitory memory having stored thereon executable instructions, which when executed by the processor, cause the processor to perform:

managing a memory area among one or more memory areas accessible by the first virtual machine so that after generation of the one or more second virtual machines, each of the first virtual machine and the one or more second virtual machines is permitted to perform a read access to the memory area until any virtual machine among the first virtual machine and the one or more second virtual machines performs a first write access to the memory area;

determining whether the memory area is a specific memory area whose content before the first write access does not need to be stored based on a classification value which is a value for identifying content of memory allocation processing, when the first write access to the memory area is performed, for a subsequent access by a virtual machine other than the any virtual machine performing the first write access;

detecting the first write access to the specific memory area;

detecting, after the first write access to the specific memory area is detected, that the virtual machine other than the any virtual machine performing the first write access is attempting the subsequent access to the specific memory area; and (i) acquiring a new memory area, (ii) copying, into the new memory area, content of the specific memory area before the attempted subsequent access to the specific memory area by the virtual machine attempting the subsequent access to the specific memory area, and (iii) allocating the new memory area, as a target of the attempted subsequent access, to the virtual machine attempting the subsequent access to the specific memory area.

* * * * *